US008306891B1

(12) United States Patent
Findlay, III et al.

(10) Patent No.: US 8,306,891 B1
(45) Date of Patent: Nov. 6, 2012

(54) POTENTIAL-BASED ASSET COMPARISON

(75) Inventors: M. Chapman Findlay, III, Los Angeles, CA (US); G. Michael Phillips, Pasadena, CA (US); William P. Jennings, Simi Valley, CA (US)

(73) Assignee: c4cast.com, Inc., Pasadena, CA (US)

( * ) Notice: Subject to any disclaimer, the term of this patent is extended or adjusted under 35 U.S.C. 154(b) by 2620 days.

(21) Appl. No.: 10/931,675

(22) Filed: Aug. 31, 2004

Related U.S. Application Data

(63) Continuation-in-part of application No. 09/692,748, filed on Oct. 19, 2000, now Pat. No. 7,337,135, which is a continuation-in-part of application No. 09/615,025, filed on Jul. 13, 2000, now Pat. No. 6,907,403.

(51) Int. Cl.
*G06Q 40/00* (2006.01)

(52) U.S. Cl. .............. 705/36 R; 705/35; 705/36; 705/37

(58) Field of Classification Search .................... 705/35, 705/36, 37
See application file for complete search history.

(56) References Cited

U.S. PATENT DOCUMENTS

| | | | |
|---|---|---|---|
| 6,484,151 B1 * | 11/2002 | O'Shaughnessy ........... | 705/36 R |
| 7,177,831 B1 * | 2/2007 | O'Shaughnessy et al. . | 705/36 R |
| 7,249,080 B1 * | 7/2007 | Hoffman et al. ............... | 705/35 |
| 2002/0059126 A1 * | 5/2002 | Ricciardi ........................ | 705/36 |
| 2002/0138383 A1 * | 9/2002 | Rhee ............................... | 705/36 |
| 2002/0152151 A1 * | 10/2002 | Baughman et al. ............ | 705/36 |
| 2003/0144936 A1 * | 7/2003 | Sloan et al. .................... | 705/36 |

* cited by examiner

*Primary Examiner* — Nga B. Nguyen
(74) *Attorney, Agent, or Firm* — Joseph G. Swan, P.C.

(57) ABSTRACT

Measurements for comparing one financial asset to another are provided. For example, in one aspect a comparison measurement is generated between a model estimate and an observed market value for an asset and then such comparison measurements are compared for two different assets. In another aspect, tracking error and performance differences between two assets are measured simultaneously, thereby providing better isolation of important information.

21 Claims, 13 Drawing Sheets

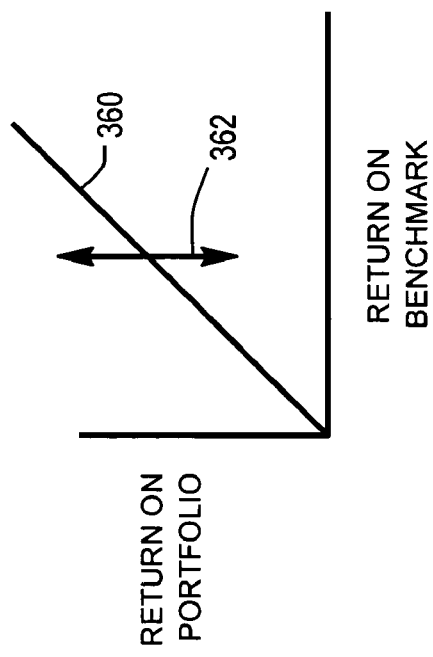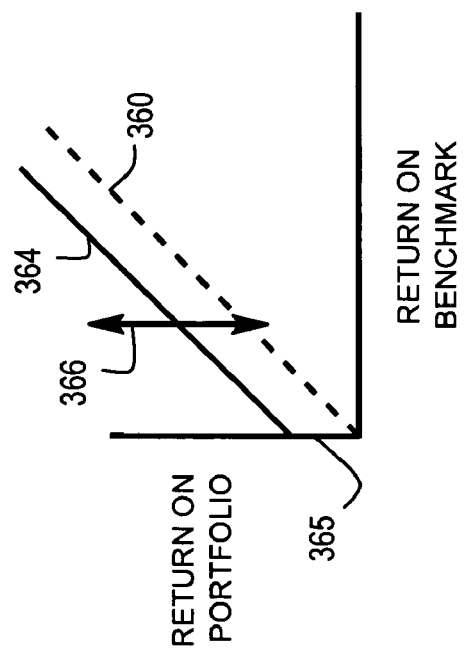

US 8,306,891 B1

POTENTIAL-BASED ASSET COMPARISON

This is a continuation-in-part of commonly assigned U.S. patent application Ser. No. 09/692,748, filed on Oct. 19, 2000 now U.S. Pat. No. 7,337,135, and titled "Asset Price Forecasting" (the '748 Application), which is a continuation-in-part of commonly assigned U.S. patent application Ser. No. 09/615,025, filed on Jul. 13, 2000 now U.S. Pat. No. 6,907,403, and titled "Identifying Industry Sectors Using Statistical Clusterization" (the '025 Application). The '748 Application and the '025 Application are incorporated by reference herein as though set forth herein in full.

BACKGROUND OF THE INVENTION

1. Field of the Invention

The present invention pertains to techniques for comparing one financial asset to another, and is particularly applicable in connection with comparing a managed portfolio, such as a mutual fund, against an index that the portfolio manager is attempting to track.

2. Description of the Related Art

The present inventors have discovered that, conventionally, very few techniques exist for effectively comparing one asset to another, particularly in terms of: (i) whether one asset is undervalued or overvalued relative to the other; (ii) whether the first asset is effectively tracking the performance of another; and/or (iii) whether the first asset is outperforming or underperforming the other. For example, conventional techniques exist for measuring how closely a portfolio is tracking the performance of an index. However, such conventional techniques typically penalize the portfolio for any deviations from the performance of the index, even if the portfolio is outperforming the index.

SUMMARY OF THE INVENTION

The present invention addresses this problem by providing new measurements for comparing one financial asset to another. For example, in one aspect a comparison measurement is generated between a model estimate and an observed market value for an asset and then such comparison measurements are compared for two different assets. In another aspect, tracking error and performance differences between two assets are measured simultaneously, thereby providing better isolation of important information.

More specifically, in one aspect the invention is directed to comparing two assets. Initially, a set of factors having data values that are likely to be correlated with a market value for at least one of a first asset and a second asset are identified (e.g., using a standard list of factors). Historical data values for such factors and historical data for observed market values of the first asset over a period of time are processed in order to obtain a first model for calculating market value estimates for the first asset as a function of such factors (e.g., using a regression technique). The first model is calculated using an input set of observed market values for the factors at a first point in time, so as to obtain a market value estimate for the first asset, and a first comparison measurement that describes a relationship between the market value estimate for the first asset and an observed market value of the first asset is generated. The foregoing steps are then repeated with respect to a second asset, and the first comparison measurement is compared to the second comparison measurement. Finally, an asset is purchased or sold, or a recommendation is made to purchase or sell and asset, based on the foregoing comparison.

The foregoing technique frequently can provide a more accurate assessment as to whether the market is overvaluing or undervaluing one asset in comparison to another. Such a comparison is particularly useful where one of the assets is a portfolio being managed and the other is an index which the portfolio manager is attempting to emulate.

In another aspect, the invention is directed to a technique in which performance information for one asset is modeled in relation to performance information for another asset (e.g., by regressing returns information for the first asset against returns information for the second). Then, the model is used to identify, estimate and/or evaluate comparison measurements for the two assets. Such comparison measurements might include, e.g., tracking error and performance differences between the two assets, and the information might be extracted, e.g., from the model's parameters or by sampling the model's results.

By virtue of the foregoing arrangement, better isolation typically can be achieved between various comparison measurements for the two individual assets.

The foregoing summary is intended merely to provide a brief description of the general nature of the invention. A more complete understanding of the invention can be obtained by referring to the claims and the following detailed description of the preferred embodiments in connection with the accompanying figures.

BRIEF DESCRIPTION OF THE DRAWINGS

FIG. 11A graphically illustrates conventional techniques for assessing the performance of a portfolio in comparison to the performance of an index, while FIG. 11B illustrates a technique according to a second embodiment of the present invention for assessing the performance of a portfolio in comparison to the performance of an index.

DESCRIPTION OF THE PREFERRED EMBODIMENT(S)

The present disclosure covers inventions that are claimed in multiple concurrently filed patent applications. Also filed concurrently herewith are the following commonly assigned patent applications: "Asset Portfolio Evaluation" and "Asset Portfolio Tracking", which applications are incorporated herein by reference as though set forth herein in full.

The following description includes aspects of the assignee's ETA® system for asset evaluation, forecasting, reporting and screening.

One significant application of the present invention is the comparison of a portfolio (e.g., a portfolio being managed) to another portfolio or index. As used herein, the term "index" when used in connection with a benchmark that is being tracked (or otherwise used as a reference for comparison to the managed portfolio) is intended to refer to any portfolio of financial assets or to any financial index, such as the S&P 500 or the Dow Jones Industrial Average.

The first section of the following disclosure describes certain metrics for use in evaluating a portfolio of financial assets, such as stocks or bonds. The second section describes techniques for adjusting a portfolio of financial assets, in order to track the performance of an index, such as the S&P 500. The third section describes techniques for comparing the performance of one asset to the performance of another asset.
Asset Portfolio Evaluation.

A main goal of the present invention is to evaluate a portfolio of financial assets, which may include any or all of stocks, bonds, commodities, shares in indexes and/or other types of funds, derivative instruments and cash. Generally speaking, asset portfolio evaluation according to the present invention involves the determination and use of "portfolio ETA® values". Each of these ETA® values measures the tendency of the aggregate market value (e.g., including paid and/or announced dividends) of the given portfolio to change based on a change in the data value for a given factor. That is, each ETA® value ($\eta_i$) is specific to a given factor (i) that is likely to be correlated with the aggregate market value for the subject portfolio. All of the ETA® values for a particular asset or portfolio sometimes collectively are referred to herein as the ETA® profile for such asset or portfolio. Once the ETA® values have been calculated, they can be aggregated to provide a composite risk measure or they can be evaluated individually, e.g., by comparing them to corresponding ETA® values for a second portfolio (or an index) or by comparing them to a threshold.

Figure 1:
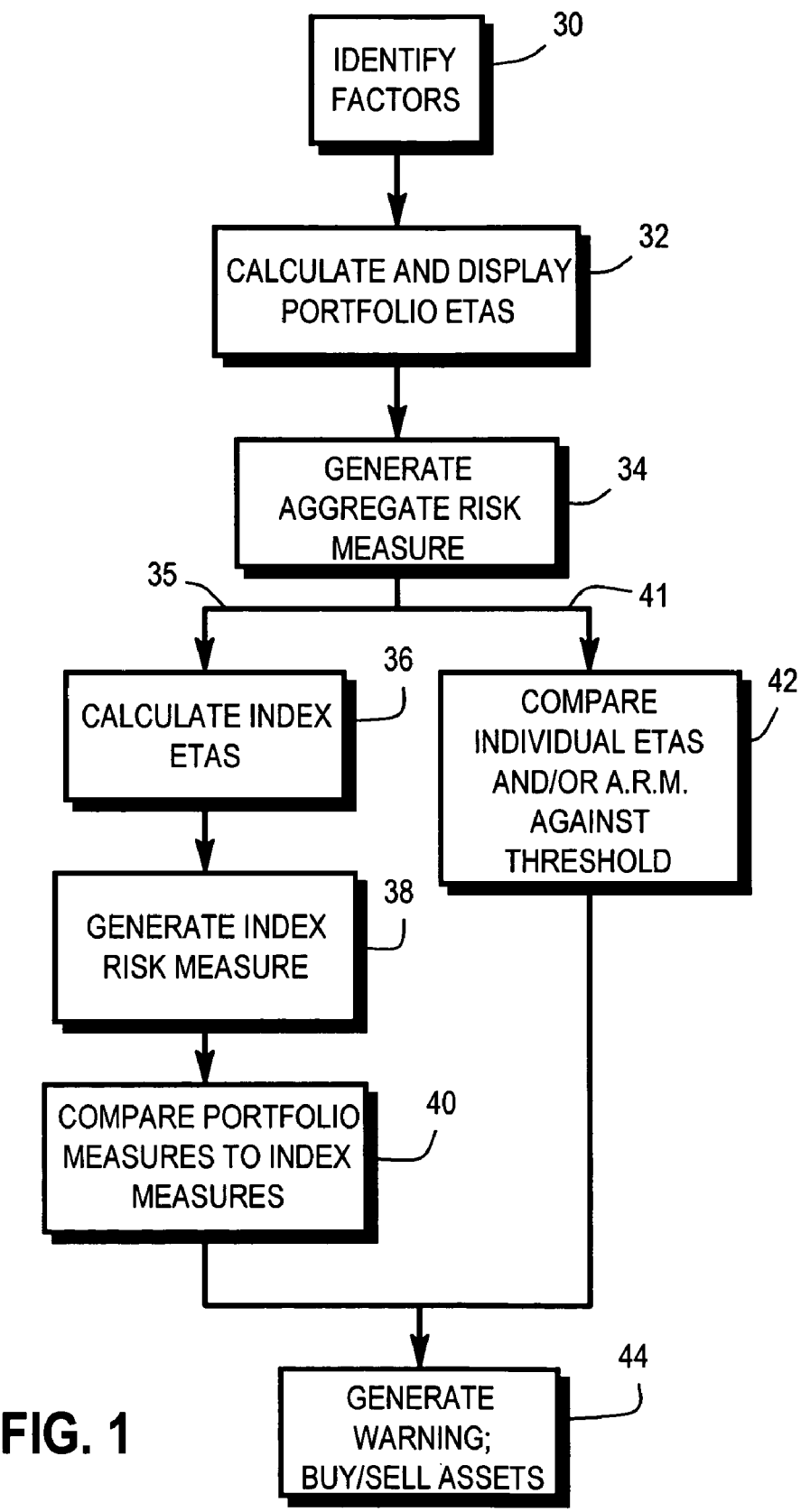
FIG. 1 is a flow diagram illustrating the generation and use of an aggregate portfolio risk measure according to a representative embodiment of the present invention.

Thus, in one embodiment of the invention, illustrated in FIG. 1, ETA® values are calculated and then either: (i) compared individually to corresponding thresholds; or (ii) aggregated to provide an aggregate risk measure which is then compared to a threshold or to the aggregate risk measure for another portfolio. Based on such comparisons, a warning indicator may be generated and displayed or some other action (e.g., buying or selling one or more assets) automatically may be recommended or initiated.

Referring to FIG. 1, in step 30 a set of factors is identified. Preferably, the factors are chosen as those being likely to be correlated with an aggregate market value for a subject portfolio. The preferred embodiment of the invention utilizes 18 different factors, although any other number instead may be used. Because it is preferable to capture a variety of different types of risk, generally it will be desirable to utilize a minimum of 5-10 different factors, each reflecting a different risk factor.

In the preferred embodiments of the invention, the factors include a variety of macroeconomic and/or financial indicators, such as stock indices (e.g., S&P 500, FTSE 100, Tokyo Exchange), commodity indices (e.g., gold price, energy cost), bond indices (e.g., corporate bond yield, short-term government bond yield, intermediate-term government bond yield, long-term government bond yield), inflation indicators (e.g., Consumer Price Index), currency exchange rates (e.g., Dollar/Euro), production indicators (e.g., housing starts), money supply (e.g., monetary base, M1, M2 or M3), corporate cash indicators, sales figures (e.g., automobiles, new durables), export figures (e.g., agricultural exports), and unemployment rate. More preferably, the following 18 factors are utilized:

FTSE (Financial Times Stock Exchange Index) 100
AM London Gold Price Index
BAA Corporate Bond Yields
Consumer Price Index
Short-Term (1-year) Government Bond Yield
Intermediate-Term (10-year) Government Bond Yield
Long-Term (20-year) Government Bond Yield
Tokyo Stock Exchange Index
Euro/Dollar Exchange Rate
Net U.S. Agricultural Exports
Total New Housing Starts
Monetary Base (Board of Governor's High Powered Money)
M2 Money Supply (Board of Governors Money Supply)
Corporate Net Cash Flow
Unemployment Rate (all workers, age 18-65)
Domestic Automobile Sales
U.S. Orders for New Durable Goods
Energy Cost Index Such broad-based macroeconomic and financial factors likely will be correlated with a variety of different types of financial assets and therefore may be utilized for a variety of different types of portfolios. In fact, it often will be desirable to use a fairly generic set of factors, so that the factors will not have to be customized to individual assets or portfolios. Utilizing a standard set of factors often will be highly desirable because the resulting ETA® values can then be used, e.g., for comparison purposes, across a number of different portfolios. Of course, if factors specifically tailored to the subject portfolio are desired, such specialized factors also (or instead) can be selected, e.g., in any of the ways described in the '748 and '025 Applications.

In step 32, the ETA® values corresponding to the identified factors are calculated for a portfolio under consideration. This step first involves the selection of a historical observation period for comparing the market value of the subject portfolio to the data values of the identified factors. Preferably, this time period is standardized in order to facilitate comparisons among different portfolios. More specifically, in the preferred embodiments of the invention the observation period is the three years immediately preceding the current date (or other base date). In any event, the selection of the observation period preferably takes into consideration the trade-off between a longer period of time, which would provide a larger number of data samples, vs. a shorter period of time (i.e., as close as possible to the current or other base date), which would more closely reflect current conditions.

Once the observation period has been established, data samples are collected during this observation period for each of the identified factors and for the market value of the portfolio. Such data are then used to calculate an ETA® value corresponding to each such factor. This can be accomplished in a number of different ways, but preferably is performed using a linear or non-linear regression of the portfolio market value against the identified factors. Alternatively, the ETA® values can be calculated in any other manner, such as by using any of the techniques described in the '748 and '025 Applications. Each ETA® value might measure: how the dollar value of the portfolio (or other subject asset) is expected to change based upon a unit change in the corresponding factor; what the percentage change in the dollar value of the portfolio (or other subject asset) is expected to be based upon a unit change in the corresponding factor; how the dollar value of the portfolio (or other subject asset) is expected to change based upon a percentage change in the corresponding factor; or what the percentage change in the dollar value of the portfolio (or other subject asset) is expected to be based upon a percentage change in the corresponding factor.

In the preferred embodiments of the invention, the statistical significance of each calculated ETA® value also is determined. The particular statistical significance measure utilized can be the correlation coefficient (e.g., in the event that a regression is utilized to determine the ETA® values) or any similar or other measure.

Preferably, the calculated ETA® values also are displayed in step 32. As noted above, each calculated ETA® value indicates a measure of the tendency of the aggregate market value of the subject portfolio to change based on a change in the data value for the corresponding factor. Thus, each ETA® value typically corresponds to a sensitivity, an elasticity or a similar measure of the subject portfolio in relation to the corresponding factor. If any particular ETA® value becomes too high, the portfolio may be deemed too risky in that regard. Accordingly, the mere display of the ETA® values often can provide a good indication of the portfolio's risk profile. This is particularly the case if the factors are chosen to reflect fairly discrete components of the economy that are largely independent of (or uncorrelated with) each other. The ETA® values may be displayed numerically, graphically or both. Preferably, any display of the ETA® values also includes an indication as to the statistical significance of each such ETA® value, e.g., by displaying the ETA® values differently depending upon their statistical significances.

Next, in step 34 an aggregate risk measure (ARM) is calculated for the portfolio by aggregating the various ETA® values calculated in step 32 above. The risk measure may be determined by simply adding the absolute values (or the squares) of all of the calculated ETA® values (or all of the statistically significant ETA® values). If the statistically insignificant ETA® values are to be discarded, then it will be necessary to calculate a measure of the statistical significance of each ETA® value and then discard those ETA® values having a statistical significance value that is below a specified threshold. Thus, for example, the ARM may be calculated as follows:

$$ARM = \sum_{i=1}^{M} |\eta_i| \quad \text{Equation 1}$$

where

ARM is the aggregate risk measure for the portfolio, and

M is the number of statistically significant ETA® values (e.g., those having a statistical significance higher than a given threshold)

The ARM defined in Equation 1 above sometimes is referred to as the Composite MacroRisk Index (CMRI). It should be understood that the CMRI represents only one possible example of an ARM.

Rather than simply discarding the "statistically insignificant" ETA® values, it also is possible to weight each ETA® value by its statistical significance or by a function of its statistical significance. Still further, rather than (or in addition to) performing a summation (or a weighted summation) of a function of the various ETA® values, an average or a weighted average of the ETA® values may be calculated (e.g., using the calculated statistical significances, or a function thereof, as the weights). Thus, for example, the aggregate risk measure instead may be calculated as:

$$ARM = \frac{\sum_{i=1}^{N} w_i |\eta_i|}{\sum_{i=1}^{N} w_i} \quad \text{Equation 2}$$

where

ARM is the aggregate risk measure for the portfolio,

N is the total number of ETA® values, and $w_i$ is the weight associated with each ETA® value, which may be the statistical significance of the ETA® value or a function of such statistical significance.

Once the foregoing quantities have been calculated, they can be compared against similar quantities for an index 35 and/or evaluated individually 41. Often, comparing the subject portfolio to an index 35 will provide more meaningful information. Therefore, this approach is discussed first.

As shown in FIG. 1, the initial step 36 in comparing a given portfolio to an index (or other portfolio) 35 is to calculate the ETA® values for the index. This can be done in the same manner as described in step 32 above for calculating the ETA® values for the initial portfolio. Preferably, the same factors are utilized and the data are observed over the same (or similar) period of time as was used to calculate the ETA® values for the subject portfolio.

It is noted that instead of (or in addition to) displaying the portfolio ETA® values in step 32, such ETA® values may be displayed in this step 36 together with the ETA® values for the index. One benefit of doing so is that the end user often will be able to more easily compare the portfolio ETA® values with those for an index (or other portfolio) that the user may wish to emulate. Once again, it may be preferable to calculate and display the statistical significances of the ETA® values for the portfolio and for the index, together with the actual ETA® values. One such technique for doing so is to display the subject ETA® values differently depending upon their statistical significances (e.g., using different colors or different intensities for different levels of statistical significance).

Next, in step 38 an aggregate risk measure is generated for the index. Once again, this step preferably is performed in the same manner as the calculation of the aggregate risk measure for the subject portfolio in step 34. Also, it is noted that steps 36 and 38 frequently can be performed in advance (e.g., on a periodic basis), with the subject values then simply being retrieved as needed.

In step 40, at least one of the calculated quantities for the subject portfolio is compared against the corresponding quantity for the index. For example, the aggregate risk measures for the two portfolios may be compared against each other. Alternatively, individual ETA® values for the portfolio may be compared against the corresponding ETA® values for the index.

The comparison may take any of a variety of different forms. For example, where it is desired to compare single quantities, one may use the absolute value or the square of the difference between the two corresponding quantities for the two different portfolios. Thus, with respect to the aggregate risk measure, one may calculate:

$$\text{Comp.} = |ARM_P - ARM_I| \text{ or } (ARM_P - ARM_I)^2 \qquad \text{Equation 3}$$

where
Comp. is the comparison measure
$ARM_P$ is the aggregate risk measure for the portfolio, and
$ARM_I$ is the aggregate risk measure for the index.

As indicated above, typically a difference is calculated between the two ARMs to be compared. However, it also is possible to calculate and then use a ratio of such compared quantities. A similar calculation as in Equation 3 may be calculated with respect to each of the individual ETA® values.

Alternatively, as noted above, it is possible to simply display the values for the portfolio simultaneously with the corresponding values for the index, thereby allowing the user to visually observe any differences. Numeric and/or graphical displays may be utilized for this purpose.

In the technique described above, certain quantities for the subject portfolio are compared against corresponding quantities for a reference portfolio or index (path 35). However, it also is possible to evaluate the quantities calculated for the subject portfolio in isolation, or in comparison to other information (path 41). Thus, in step 42 each of the individual ETA® values and/or the ARM for the subject portfolio is compared against a corresponding threshold.

The comparison of the calculated quantities (e.g., individual ETA® values or the ARM) to a threshold often can provide the basis for automatically generating a warning or initiating some other action (as described below in connection with step 44). The threshold to which the desired quantities are compared can be fixed by the user or can be varied based on other data. For instance, the ARM threshold may be set based upon historical values of the ARM for a particular index (e.g., with respect to a stock portfolio, the S&P 500), based upon volatility in the relevant market (e.g., with respect to a bond portfolio, current interest rate fluctuations) or based upon any other information.

In step 44, an action is triggered automatically based upon the comparison in step 40, in step 42, or both. Thus, for example, if any of the calculated quantities exceeds the threshold to which it has been compared, the system may provide a warning to the end user. Alternatively, any single condition or any desired combination of conditions may automatically trigger additional processing, such as the automatic purchasing or selling of assets. Such automatic purchasing and/or selling may be in an attempt to adjust the portfolio as described in more detail in the section titled "Asset Portfolio Tracking" below. Also, the purchase and/or sale decisions may be implemented automatically or may be simply suggested to the end user for the end user to make the ultimate determination.

For the purpose of implementing or recommending appropriate buy/sell orders, a system according to the present invention preferably has within its database pre-calculated ETA® values for many if not all of the individual assets within the portfolio. These ETA® values can be calculated in the same manner used to calculate the ETA® values for the portfolio as a whole. In fact, the portfolio ETA® values can even be generated in step 32 above by combining the ETA® values for the individual assets within the portfolio. In addition, the system's database preferably includes ETA® values for assets that are not presently in the portfolio but are considered as potential candidates to be added to the portfolio. In the preferred embodiments of the invention, the individual asset ETA® values are updated periodically (e.g., on the same schedule as the ETA® value calculations for the index). Accordingly, current individual asset ETA® values only need to be retrieved when needed.

Then, for example, if the system determines that the portfolio has excessive risk with respect to one or more factors, some of the assets within the portfolio that have the highest risk exposure with respect to those factors may be sold. Alternatively, assets having high ETA® values with respect to those factors, but in the opposite direction as the corresponding ETA® value for the portfolio as a whole, may be added to the portfolio. Once again, more detail regarding such portfolio adjustment to obtain an acceptable risk profile is discussed below.

In the embodiment described above, the focus is on the individual ETA® values and on the ARM (which is calculated based on the individual ETA® values). In an alternate embodiment, the individual ETA® values of the portfolio are compared to the corresponding ETA® values for the index. Such a technique is preferred in certain cases, particularly when one wishes to track or emulate the index using a (typically smaller) portfolio of financial assets (and/or assets not contained in the index).

Figure 2:
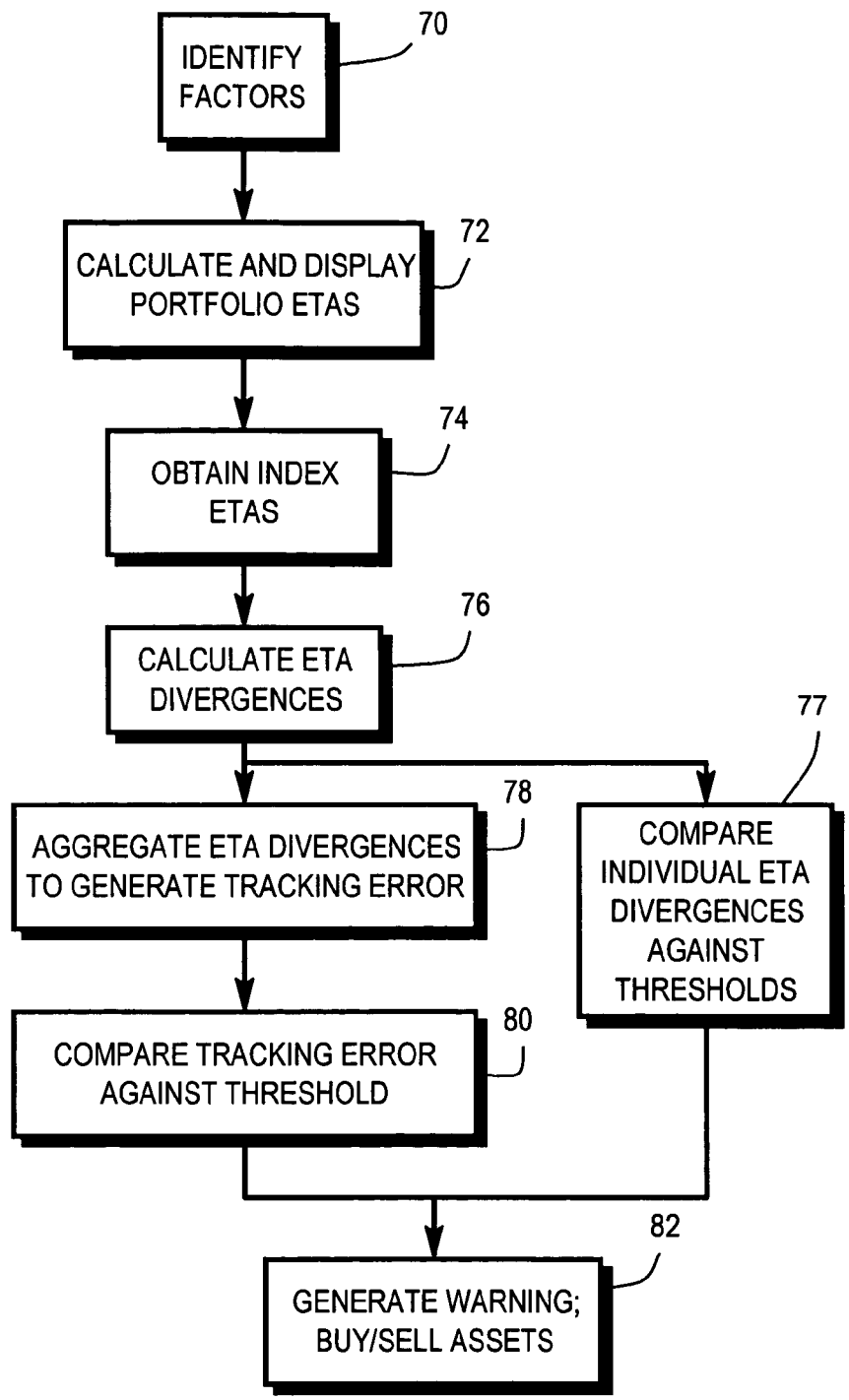
FIG. 2 is a flow diagram illustrating the generation and use of individual ETA® divergences according to a representative embodiment of the present invention.

Thus, referring to FIG. 2, in step 70 a set of factors is identified. Preferably, the factors are chosen as those being likely to be correlated with an aggregate market value for a subject portfolio and/or with an aggregate market value for an index to be tracked. The preferred embodiment of the invention utilizes the same 18 factors identified above, although any other factors and/or number of factors may instead be used. Once again, because it is preferable to capture a variety of different types of risk, generally it will be desirable to utilize a minimum of 5-10 different factors.

As in the embodiment described above, the use of broad-based macroeconomic and financial factors tends to increase the likelihood that such factors will be correlated with a variety of different types of financial assets and therefore may be utilized for a variety of different types of portfolios. Once again, however, if factors specifically tailored to the subject portfolio are desired, they can be selected, e.g., in any of the ways described in the '748 and '025 Applications.

In step 72, the ETA® values corresponding to the identified factors are calculated for the portfolio under consideration. This step may be performed, e.g., in any of the ways described above in connection with the description of step 32. In addition, the calculated ETA® values preferably are displayed in this step 72.

In step 74, the ETA® values corresponding to the identified factors are obtained for the index (or other portfolio). Once again, these values can be calculated in the same manner as described in step 32 above or maybe simply retrieved from storage if pre-calculated. Preferably, the same factors are utilized and the data are observed over the same (or similar) period of time as was used in step 72 to calculate the ETA® values for the subject portfolio.

In step 76, ETA® divergence measures are calculated between the ETA® values for the subject portfolio and the ETA® values for the index. Such divergent measures sometimes collectively are referred to herein as the divergent ETA® profile. One technique for calculating such measures is as follows:

$$d_i = \eta_{Pi} - \eta_{Ii} \quad \text{Equation 4}$$

where $d_i$ is the divergent measure for factor i, $\eta_{Pi}$ is the portfolio ETA® value for factor i, and $\eta_{Ii}$ is the index ETA® value for factor i.

The foregoing technique simply calculates the difference between the two corresponding ETA® values. However, the ETA® divergences instead may be defined to be a function of such difference, such as (i) an exponential function of the difference; (ii) a power of the difference, but with the sign retained; or (iii) for purposes where direction is unimportant, the absolute value or the square of the difference.

Alternatively, the ETA® divergence measure may be calculated as, or as a function of, the ratio of the two corresponding ETA® values, e.g.:

$$d_i = f(\eta_{Pi}/\eta_{Ii}) \quad \text{Equation 5}$$

where $f(x)$ may be defined, e.g., to equal x, log(x) or $x^y$, in any of the foregoing cases with the sign retained or discarded, as appropriate For purposes of the following discussion, it is assumed that the ETA® divergence measure is calculated as shown in Equation 4. However, any of the other ETA® divergence measures instead may be used.

Once the ETA® divergence measures have been obtained, they may be evaluated directly or may be combined to provide an overall divergence (or tracking error) measure. With regard to the former, in step 77 each individual ETA® divergence is compared against a threshold. The threshold may be the same across all ETA® divergences or may be different for each. For instance, each such threshold may be a function of the variance or standard deviation of the ETA® value over time with respect to the subject index.

As to the latter, in step 78 the individual ETA® divergence measures are aggregated. For example, an aggregate ETA® divergence measure (or tracking error) may be calculated as:

$$TrackingError = \eta_{EE} = \sqrt{\frac{\sum_{i=1}^{M} d_i^2}{M}} \quad \text{Equation 6}$$

where $\eta_{EE}$ is defined as the ETA® emulation error, and

M is the number of ETA® values that are statistically significant, depending upon the specific embodiment, for the portfolio, for the index or for both.

In Equation 6 above, all of the statistically significant divergent ETA® measures are combined equally. However, similar to the above-referenced combination of individual ETA® values, it also is possible to weight the individual divergent ETA® measures, such as:

$$TrackingError = \sum_i w_i |d_i|; \quad \text{Equation 7}$$

$$TrackingError = \sum_i w_i |d_i|^2; \text{ or} \quad \text{Equation 8}$$

$$TrackingError = \sqrt{\frac{\sum_{i=1}^{N} w_i d_i^2}{\sum_{i=1}^{N} w_i}} \quad \text{Equation 9}$$

where $w_i$ be a constant or, e.g., may be a function of the statistical significance of the ETA® value for the portfolio, the ETA® value for the index, or both, and in each case, the summation preferably is performed over all divergent ETA® measures (corresponding to all of the factors or all of the ETA® values, i.e., without discarding the statistically insignificant values, but instead applying a lower weight to them), although in this case too the statistically insignificant values may be discarded.

Any of a variety of different techniques for combining the various divergent ETA® measures in order to provide a measure of tracking error may be utilized. Accordingly, the tracking errors defined above should be understood to be merely exemplary.

Next, in step 80 the calculated tracking error is compared against a threshold. Once again, the threshold may be a fixed quantity or instead may be a function of one or more of the quantities, such as measurements of historical variations in the ETA® values.

In step 82, an action is triggered automatically based upon the comparison in step 77, in step 80 or both. Thus, for example, if any of the calculated quantities exceeds the threshold to which it has been compared, the system may provide a warning to the end user. Alternatively, any single condition or any desired combination of conditions may automatically trigger additional processing, such as the automatic purchasing or selling of assets. Once again, such automatic purchasing and/or selling may be in an attempt to adjust the portfolio as described in more detail in the section titled "Asset Portfolio Tracking" below. Also, the purchase and/or sale decisions may be implemented automatically or may be simply suggested to the end user for the end user to make the ultimate determination. As in the previous embodiment, for the purpose of implementing or recommending appropriate buy/sell orders, a system according to the present invention preferably has within its database pre-calculated ETA® values for many if not all of the individual assets within the portfolio.

Asset Portfolio Tracking.

The ETA® values and ETA® profiles described above can be used to facilitate tracking of an index or other portfolio. For example, a manager of a relatively small fund may wish to track a much larger index, such as the S&P 500. Even where a fairly large fund is being managed, it often will be the case that relatively small transactions need to be made (e.g., to invest additional funds or to sell off some assets to obtain cash). Also, a decision might be made to alter the investment strategy for an existing portfolio so that the portfolio begins to track a specified index. The following techniques generally can permit systematic identification of particular assets to buy or sell, often permitting good tracking of an index in such cases without the necessity of buying or selling proportionate holdings for the entire index.

One of the simplest techniques according to the present invention is to obtain the divergent ETA® profile between the managed portfolio and the tracked index, identify the individual asset (e.g., stocks) that has an ETA® profile as close as possible to such divergent ETA® profile (or to the negative of the divergent ETA® profile), buy or sell such asset as appropriate in order to reduce the divergent ETA® profile as much as possible, and then repeat the process. In one embodiment of this technique, it is assumed that modifications need to be made to a portfolio being managed in order to invest additional funds or to liquidate some of the assets in the portfolio to satisfy cash needs (e.g., to distribute to investors who have sold their shares in the fund).

Figure 3:
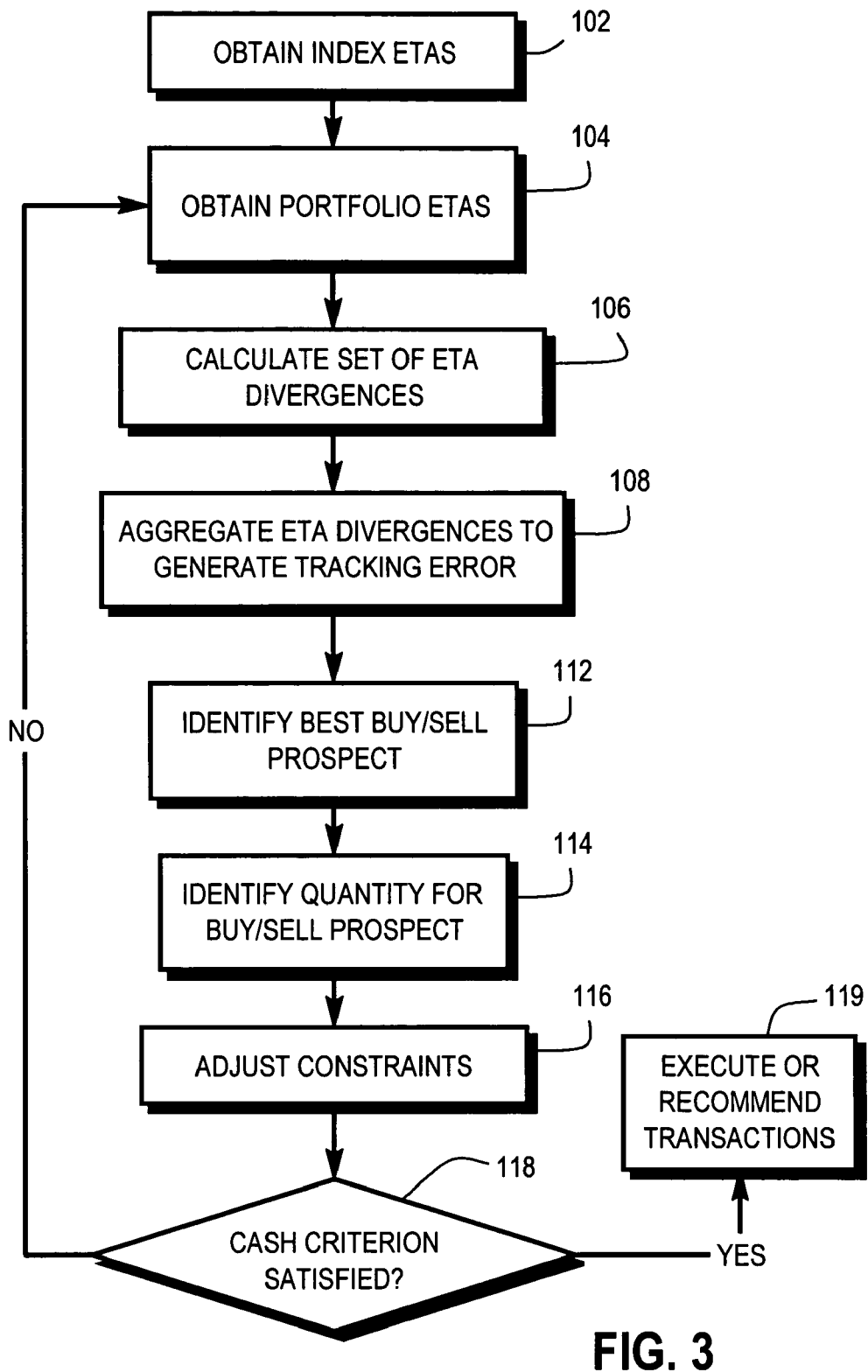
FIG. 3 is a flow diagram illustrating a technique for tracking an index or other portfolio according to a first representative of the embodiment of the present invention.

Referring to FIG. 3, in step 102 the ETA® values are obtained for the index to be tracked. In the preferred embodiments of the invention, these ETA® values previously have been calculated (e.g., using any of the techniques described above) and are available to be retrieved. More preferably, the ETA® profile for the index is calculated on a periodic basis (e.g., daily or weekly), and the most current values can be retrieved when needed. Of course, tracking of the ETA® profile for the index implies a previous selection of factors to which the ETA® values correspond. Those factors may be selected in accordance with the criteria set forth above and, once selected, generally will continue to be used over a long period of time. However, it is possible to add new factors, delete existing factors or replace factors over time as economic conditions change (new dependencies arise or existing dependencies become obsolete), new information becomes available and/or as the relationships between the individual factors change over time (e.g., where two of the factors being utilized become increasingly correlated with each other).

In step 104, ETA® values are obtained for the portfolio being managed. These values also may be calculated using any of the techniques described above. They may be recalculated as needed (e.g., in order to obtain the most current information), but ordinarily previously will have been calculated, e.g., in the other steps of this method) and therefore will be available to be retrieved.

In step 106, the ETA® divergent profile is calculated between the portfolio being managed and the index being tracked. Once again, these quantities may be calculated using any of the techniques described above.

In step 108, the ETA® divergences are aggregated in order to determine a measure of the tracking error. Once again, this measure may be calculated using any of the techniques described above.

In step 112, the best asset to buy or sell is identified. Typically, if cash needs to be put into the managed portfolio then the process only will look at purchasing additional assets, and if cash needs to be taken out of the portfolio then the process will only look at selling assets. However, in either such case the opposite transaction may be performed in order to provide additional flexibility in reaching the ultimate goal of more closely tracking the subject index, provided that subsequent offsetting transactions are identified so that the total amount of cash at the end of the process satisfies the applicable constraints.

Preferably, step 112 selects the asset that has an ETA® portfolio that is as close as possible to the divergent ETA® profile (for assets to be sold) or has an ETA® profile that is as close as possible to the negative of the divergent ETA® profile (for assets to be acquired). As indicated above, it often is desirable (but not necessary) to look only at possible purchases or only at possible sales.

In addition, it might be desirable to consider other criteria as well. For example, one might wish to constrain the search for possible assets to a limited subset that is manually selected or that is automatically selected to achieve some other goal. One such goal might be to have the managed portfolio resemble as closely as possible the makeup of the index being tracked, so that a casual observer will not notice too many differences between the managed portfolio and the tracked index. It is noted that if the ETA® factors are selected appropriately, such a consideration likely would be primarily for purposes of appearance. However, such appearances might matter to a potential investor, particularly if the investor is not aware of the present ETA® tracking technique.

Thus, the buy list or the sell list, as appropriate, may be generated in any of a variety of different ways and based upon any of a variety of different considerations. Of course, the simplest technique is to use all of the assets in the portfolio as the sell list and to use all of the assets in the index (although any other relevant universe may be used) as the buy list.

In any event, once the appropriate buy list and/or sell list has been established, the specific asset may be selected from the list. For this purpose, it is preferable to examine the ETA® profiles for all of the assets under consideration. With this information, an appropriate asset may be identified, e.g., by finding the asset in the subject list(s) that satisfies the following:

$$\max_a \left( \sum_i d_i f_a \hat{\eta}_{ai} \right), \quad \text{Equation 10}$$

where $$\max_a$$

is the maximum over all assets a;

$d_i$ is the divergent measure between the ETA® values for the managed portfolio and the tracked index with respect to factor i;

$f_a$ is +1 if the asset is to be sold and −1 if the asset is to be purchased; and $\hat{\eta}_{ai}$ is the ETA® value of asset a with respect to factor i, normalized so that the ETA® profile for all assets have the same "magnitude", e.g.:

$$\hat{\eta}_a = \frac{\overline{\eta}_a}{\|\overline{\eta}_a\|},$$

where $\overline{\eta}_a$ is a vector of the ETA® profile for asset a;

$\|\overline{\eta}_a\|$ is the magnitude of the vector; and $\hat{\eta}_a$ is the normalized vector.

Alternatively, any corresponding measurement may be utilized for finding the asset (from a given list or set) whose ETA® profile most closely corresponds to the divergent ETA® profile. For example, the effect of a purchase or sale (as applicable) of a small incremental amount of each potential asset/transaction on the tracking error may be examined, and the asset/transaction with the greatest reduction selected. In any event, by the conclusion of this step 112, both an asset and a type of transaction (i.e., purchase or sale) will have been identified.

In step 114, the quantity of the purchase or sale is determined. This step may be performed in a variety of different ways. In the preferred embodiments of the invention, the goal is to minimize the aggregate tracking error as much as possible, subject to any other constraints, such as: the total maximum amount of cash that can be put into or withdrawn from the managed portfolio; or the maximum amount of the particular asset that can be purchased or sold, as the case may be (which amount may be specified by the user or may be set based upon other considerations, e.g., a rule against short-selling or a general rule that no single asset may comprise more than x percent of the total portfolio).

Depending upon how the ETA® values and the corresponding ETA® discrepancies are defined, it may be possible to calculate a closed form solution to determine the transaction volume that will minimize the tracking error. For example, such a solution may be possible where the ETA® profile for a given portfolio is simply the weighted sum of the ETA® profiles for the assets within the portfolio. It is noted that any such solution should account for the fact that each transaction results not only in the acquisition or divestiture of a quantity of an asset, but also in a corresponding divestiture or acquisition of cash (which, of course, has an ETA® profile of all zeros). Once the optimal quantity is determined in accordance with such a closed form solution, it may be modified as necessary in accordance with any of the aforementioned constraints to provide the output quantity.

However, in certain cases it will not be possible to determine a closed-form solution to the problem. In such cases, the optimal quantities (or the constraint-modified optimal quantities) may be determined using any of a variety of numerical searching techniques, including incremental analysis, interpolation, extrapolation or any combination of the foregoing. In most of such techniques, any user-specified or other constraints can be built into the process (i.e., by limiting the range of potential transaction quantities that are to be searched). As a result, it generally will not be necessary to modify the resulting quantity.

In step 116, any necessary modifications to the specified constraints are made. For instance, if one of the constraints previously limited additional purchases of asset x to 10,000 shares, but only 6,000 shares were required to be purchased when the optimal quantity was reached, then the constraint should be modified so that no more than 4,000 additional shares of asset x may be purchased. Similarly, if the foregoing purchase requires $180,000, then that amount should be deducted from the required additional quantity of cash to invest into the managed portfolio.

In step 118, a determination is made as to whether the required cash criterion has been satisfied. As noted above, the usual motivation for executing the present process is to either put additional cash into the managed portfolio or take cash out of the portfolio. Thus, in this step it is determined whether there have been enough net purchases or sales to satisfy the specified criterion. If so, then processing proceeds to step 119.

In step 119, the identified transactions either are recommended (e.g., in the event that the foregoing process steps are executed by a computer and a human being is required to make the final transaction decisions) or are executed (e.g., automatically by a computer or by the same person who performed the foregoing process steps).

Alternatively, if a negative determination was made in step 118, then processing proceeds to step 104. In step 104, a new ETA® profile is calculated for the portfolio (assuming execution of the transaction that was just identified). It is noted that this calculation (together with any or all of the calculations to be made in the following steps 106 and 108) often will already have been performed in connection with the previously discussed steps for identifying the transaction.

As result of the foregoing process, a combination of transactions is identified. It should be apparent that the goal of each transaction in the foregoing process is to minimize the tracking error. Eventually, enough transactions are performed that the required cash inflow or outflow is accommodated.

The foregoing process is flexible enough to accommodate a number of variations. For example, a user may manually specify a certain number of transactions and then cause the foregoing process to be performed in order to specify the remainder of the transactions. In such a case, the user-specified transactions preferably are performed first, thereby allowing the foregoing process the maximum flexibility in realigning the ETA® profiles of the managed portfolio and the tracked index.

As already noted above, a variety of different transaction preferences and constraints also may be accommodated in the foregoing process. These include constraints regarding the final cash position of the portfolio, maximum quantities of particular assets to be included within the portfolio, and general preferences, such as a preference that the final portfolio have approximately the same proportionate composition as the tracked index.

In the process described above, a direct sequence of transactions is identified. While such a technique generally will be adequate, in many cases it will not find the optimal solution. For example, if only a single transaction is required the process described above typically will provide a very good result.

However, if two transactions ultimately are required to satisfy the cash-flow criterion, a process in which each step is optimized in isolation might result in a non-optimal combination. This can be seen graphically with reference to FIGS. 4A-C.

Figure 4A:
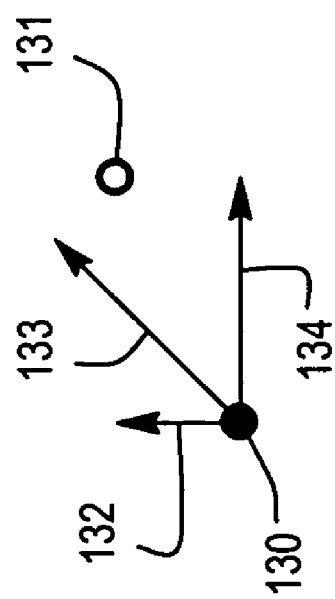
FIGS. 4A-D graphically illustrate the problem of tracking an index ETA® profile by attempting to move the ETA® profile for a managed portfolio closer toward the ETA® profile for the index being tracked.
Figure 4B:
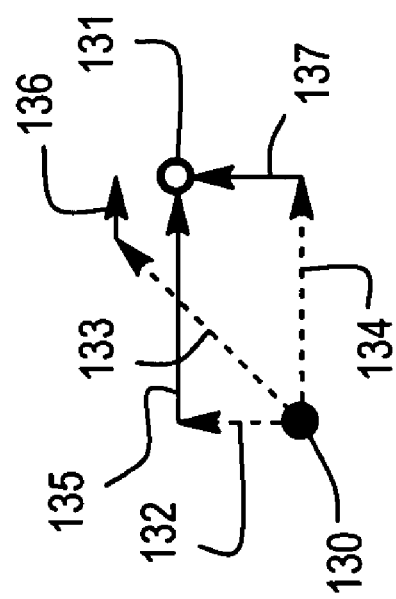
Figure 4C:
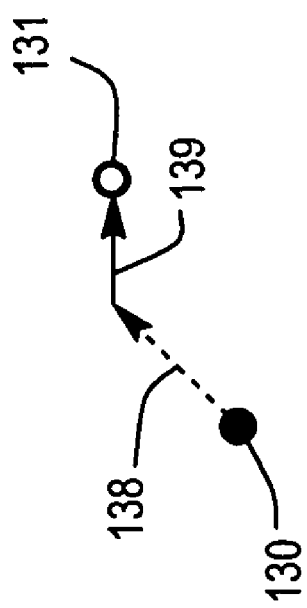

Specifically, FIGS. 4A-C illustrate the problem of moving from an ETA® profile for the managed portfolio (illustrated as starting point 130) to an ETA® profile for the index being tracked (illustrated as point 131) in a two-dimensional space (corresponding to two ETA® factors). In each of FIGS. 4A-C, only three assets are available for purchase or sale, represented by the three directional vectors 132-134. It is further assumed that the negatives of vectors 132-134 are not available (i.e., only one type of transaction, purchase or sale, is available). The problem then is how the three assets (or correspondingly the three directional vectors) can be utilized to move the ETA® profile for the managed portfolio as close as possible to the tracked ETA® profile 131.

FIG. 4A illustrates the three optimal quantities for each asset 132-134. As is readily apparent, the method described above would result in a transaction involving asset 133, in the quantity illustrated, for the first transaction. That is, such a transaction would move the managed portfolio ETA® profile closest to the desired ETA® profile. This clearly is the optimal solution if only a single transaction is required.

On the other hand, the situation changes if another transaction is required. For example, if assets are being purchased and a single transaction does not result in a sufficient amount of cash being transferred into the managed portfolio, then the method described above would require a second transaction.

The effect of such a subsequent transaction is illustrated in FIG. 4B. At this point, after purchasing the quantity of asset 133 shown in FIG. 4A, the optimal transaction would be to purchase a quantity of asset 134. More specifically, the ideal transaction would be to purchase a quantity of asset 134 that would result in vector 136. Such a transaction clearly would move the ETA® profile of the managed portfolio closer to the ETA® profile 131 of the tracked index.

However, if it were known from the outset that two transactions were required, a different course of action would have been optimal. For instance, still referring to FIG. 4A, the first transaction could have been the purchase of asset 132 in the quantity indicated by that vector. Then, the optimal second transaction would have been an appropriate quantity of asset 134 (in the quantity indicated vector 135). This two-transaction combination would have resulted in an end state that was exactly as desired (i.e., an ETA® profile that is exactly equal to profile 131), which is a clear improvement over the result that would have been achieved with the method described above. An equally good result, also shown in FIG. 4A, would have been achieved by first selecting a transaction represented by vector 134 and then selecting a transaction represented by vector 137.

FIG. 4C illustrates yet another way that the optimal result could have been achieved. With this result, the first transaction still involves a quantity of asset 133 (represented by vector 138), but one in which the quantity is smaller than what is illustrated in FIGS. 4A-B. If the quantity were in fact restricted as illustrated in FIG. 4C, then the next optimal step (even in accordance with the foregoing method) would dictate a quantity of asset 134 (as represented by vector 139). Once again, the result would be to end up at exactly the desired ETA® profile 131.

Both of the improved solutions illustrated in FIG. 4B and FIG. 4C typically will require some amount of looking ahead, which is not accommodated by the method of FIG. 3. The question then it is how to efficiently implement such looking ahead. It is of course possible to perform an exhaustive search of nearly all possible combinations of transactions. However, the amount of time and/or resources required to perform such a search would be impractical. However, near-optimal results often can be obtained using the techniques described herein and/or other sub-optimal techniques.

For example, in the second embodiment described below in connection with FIGS. 5-7, a tree-searching process is performed. In the third embodiment described below in connection with FIG. 8, subsets of the available assets that are likely to lead to good results are pre-generated. FIG. 9 illustrates a portfolio adjustment technique that is similar to the technique shown in FIG. 5, but that may be utilized when required cash flow is not the driving factor.

In addition, the use of look-ahead processing with regard to the quantity of a particular asset to purchase or sell can be incorporated into step 114, described above, in order to provide a more optimal embodiment. For instance, rather than simply selecting the quantity that moves the ETA® profile for the managed portfolio closest to the ETA® profile for the tracked index, a modified quantity may be selected in view of the ETA® profiles for the other potential assets. In this regard, with reference to FIGS. 4A-C, an optimal quantity irrespective of any subsequent transaction may be identified (as in FIG. 4A). Then, an optimal quantity assuming that the next transaction involves each other potential asset may be identified.

Such a technique is illustrated by referring back to FIGS. 4A-C. When viewed in isolation, the quantity of asset 133 is as shown in FIGS. 4A-B. When assuming that the next transaction would involve a scaled version of the vector 134, the quantity for the initial transaction shown in FIG. 4C would result. When assuming that the next transaction would involve a scaled version of the vector 132, the quantity for the initial transaction shown in FIG. 4A again would result, because no subsequent transaction involving asset 132 would result in a better ETA® profile. Thus, the optimal transaction would include vectors 138 and 139, as shown in FIG. 4C.

Figure 4D:
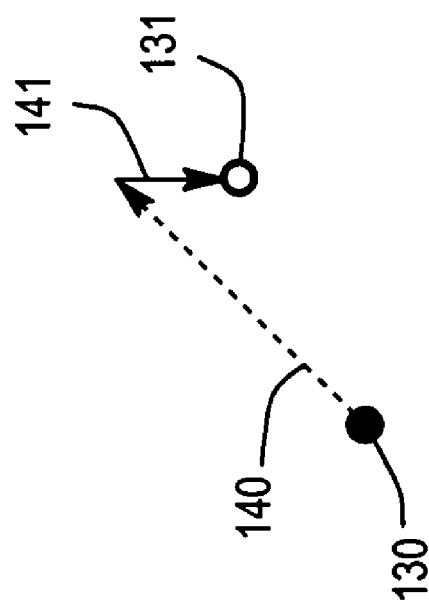

It is noted that if both purchases and sales of each asset are permitted, a scaled version of vector 132 would be possible for the second transaction. In that case, the quantity 140 (shown in FIG. 4D) preferably would be determined for the asset 133, and then the quantity 141 (also shown in FIG. 4D), which is in the reverse direction and therefore would correspond to the opposite transaction, would be selected for asset 132.

It is further noted that the examples illustrated in FIGS. 4A-D are much simpler than the problems that would be encountered in a real-world situation, given that the cited example involves only two ETA® factors and three potential assets, as compared, e.g., to 18 ETA® factors and hundreds of potential assets. In addition, it typically will not be the case that simple vector addition can be utilized to determine the effect of any given transaction on the ETA® profile for the managed portfolio. At the very least, any real transaction will generate or absorb cash, which will have the effect of modifying the ETA® profile that otherwise would result. Nevertheless, such additional operations are straightforward to implement and, even if they cannot be easily represented in a closed form, can be readily simulated on a computer. A similar comment applies to other references herein in which ETA® profiles are represented as vectors and/or in which purchases or sales of assets are represented as simple vector operations.

As noted above, FIG. 5 illustrates a tree-searching process that often can provide near-optimal results, by providing a degree of looking ahead. Referring to FIG. 5, in step 102 (described above) the ETA® profile is obtained for the tracked index.

Next, in step 150 the ETA® profile is obtained for the managed portfolio. The first iteration of this step is identical to step 104 (described above in connection with the discussion of FIG. 3). In subsequent iterations, multiple states (each corresponding to a different transaction sequence) typically will be considered, and an ETA® profile is obtained for the portfolio with respect to each such state (or transaction sequence).

In step 152, an ETA® divergent profile is generated for each state. This step is similar to step 106, except that after the first iteration there generally will be multiple states, rather than just one, for which an ETA® divergent profile will need to be calculated.

In step 154, a tracking error is calculated for each state. This step is similar to step 108, except that after the first iteration there generally will be multiple states, rather than just one, for which a tracking error will need to be calculated.

In step 156, a new set of states is generated for each existing state. This step generally involves, for each current state, generating a set of possible transactions that are likely to be optimal or near-optimal given such state. The resulting multiplicity of states then can be pruned to eliminate those which do not appear to correspond to optimal transaction sequences. Step 156 is discussed in more detail below in connection with FIGS. 6 and 7.

In step 158, a determination is made as to whether or not the specified cash-flow criterion has been satisfied. This step is similar to step 118, except that after the first iteration there generally will be multiple states to consider in this step. Because each state reflects a different transaction sequence history, each such state typically will result in a different net cash flow. Preferably, an affirmative determination is made in this step 158 only if the cash criterion has been satisfied for all existing current states. If not, then processing returns to step 150 to obtain the ETA® profile for each existing state. As with the process according to FIG. 3, many of such ETA® profiles already will have been calculated (in connection with the performance of step 156) and therefore need only be retrieved.

On the other hand, if the cash criterion has been satisfied for all existing final states, then processing proceeds to step 160 in which the best state (and, correspondingly, the best sequence of transactions) is selected. Preferably, this determination is made by calculating (or obtaining, if previously calculated) a tracking error for each such final state. The best state can then be selected as the one having the smallest tracking error.

Alternatively, the tracking error may be utilized in combination with any other user-specified criteria. For example, the user might set a criterion that attempts to match the proportionate makeup of the managed portfolio to the proportionate makeup of the index. In the event that multiple criteria are utilized, any desired weights may be specified with respect to each such criterion.

In any event, in step 161 the identified transactions either are recommended (e.g., in the event that the foregoing process steps are executed by a computer and a human being is required to make the final transaction decisions) or are executed (e.g., automatically by a computer or by the same person who performed the foregoing process steps).

Figure 5:
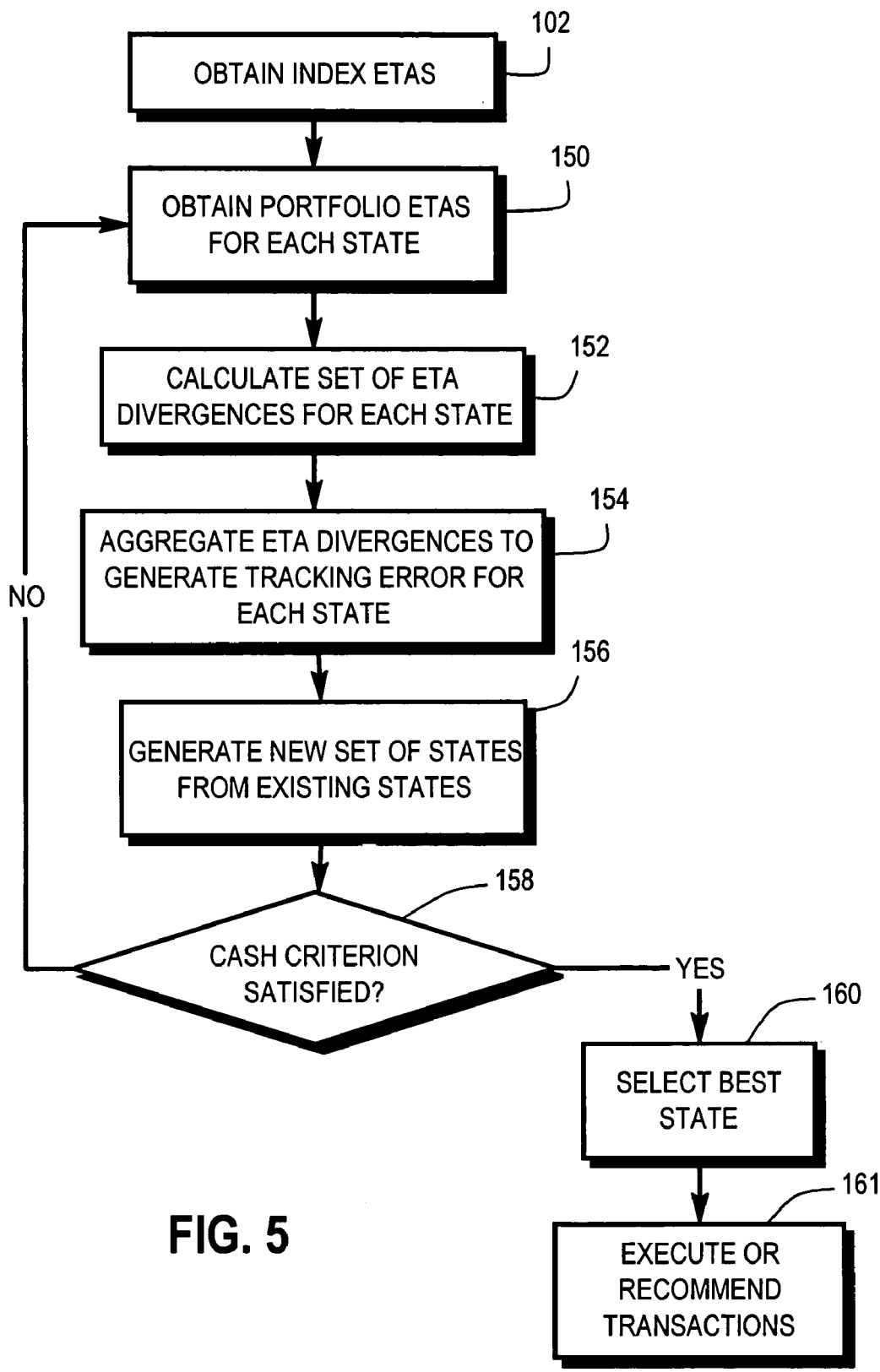
FIG. 5 is a flow diagram illustrating a tree-searching technique for tracking an index or other portfolio according to a second representative of the embodiment of the present invention.
Figure 6:
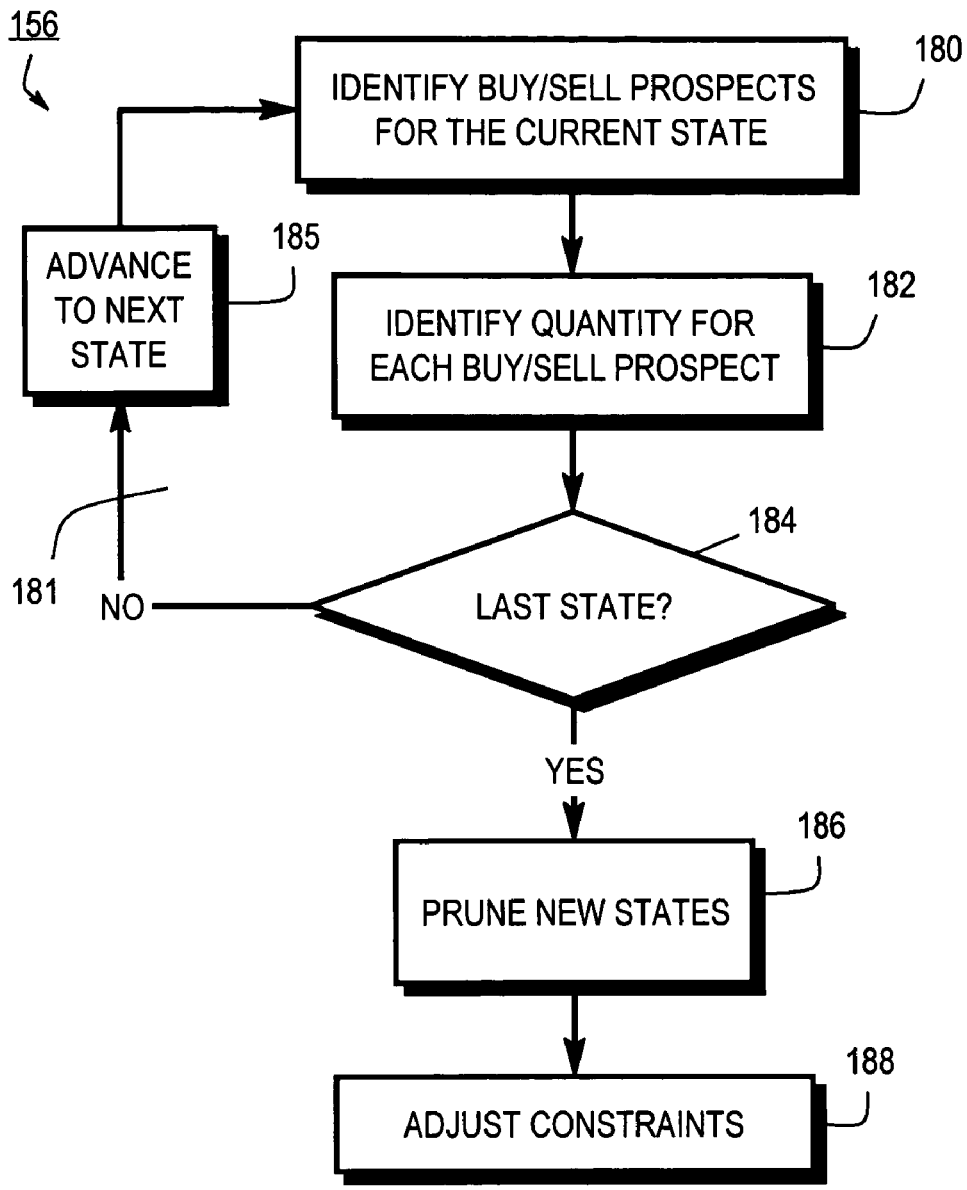
FIG. 6 is a flow diagram illustrating a technique for generating new states for the tree-searching in the process of FIG. 5.

FIG. 6 illustrates a process for generating a new set of states from the existing set of states (i.e., step 156 in FIG. 5), according to the present invention. Initially, in step 180 the buy/sell prospects for the current state are identified. In this regard, the input to the process illustrated in FIG. 6 might consist of a single state (e.g., in the first iteration of the process shown in FIG. 5), but more typically will consist of multiple different states, with a different state being processed in each iteration of loop 181.

Step 180 preferably is similar to the step 112 (shown in FIG. 3). For example, the same considerations apply in determining the overall buy and/or sell lists. However, rather than finding a single best candidate asset to buy or sell, in step 180 multiple assets may be identified. In this regard, the precise number of assets identified may be fixed for each iteration of step 180 (i.e., always selecting the best N assets) or may be varied from iteration to iteration. For example, in one embodiment the process selects any assets having a normalized ETA® profile whose inner product with the normalized divergent ETA® profile exceeds a specified threshold. Alternatively, rather than using a fixed threshold, the threshold may be varied from iteration to iteration based upon any natural clustering of such inner products across all potential assets.

In step 182, the optimal quantity is determined for each buy-sell prospect. This step is similar to step 114 discussed above (and shown in FIG. 3) and may be implemented with or without look-ahead processing, as also discussed above.

In step 184, a determination is made as to whether the last of the current states has been processed. If not, then the next of the current states is selected in step 185 and processing returns to step 180 to repeat the process for this next state. Once all of the current states have been processed, processing proceeds to step 186.

In step 186, the newly generated states are pruned. In this regard, multiple new states (each corresponding to a different next-subsequent transaction) typically will have been generated for each of the previously existing states. Accordingly, in order to avoid an exponential growth in the number of states that must be processed, it generally will be desirable to eliminate some of the newly generated states. This can be accomplished, e.g., by calculating a tracking error for each new state and eliminating all states except those having the lowest tracking errors. Alternatively, if a look-ahead processing is implemented in either or both of steps 180 and 182, the likely look-ahead tracking error (i.e., after taking into account anticipated subsequent transactions) instead may be used.

The precise number of states to retain may be fixed for each iteration of step 186 (i.e., always selecting the best M states) or may be varied from iteration to iteration. For example, in one embodiment the process selects any states having a tracking error that is lower than a specified threshold. Alternatively, rather than using a fixed threshold, the threshold may be varied from iteration to iteration based upon any natural clustering of the tracking errors over all of the states.

In step 188, the constraints pertaining to the newly generated states are adjusted from the corresponding constraints for the states from which such newly generated states have been generated. For example, if the parent state required an additional $100,000 to be invested into the managed portfolio and the transaction that resulted in the new state required a $70,000 investment, then the constraint would be modified to require an additional $30,000 to be invested into the managed portfolio. Similarly, if the parent state limited acquisitions of the asset to 3,000 shares and 2,000 shares of the asset were purchased to generate the new state, then the criterion would be modified to permit an additional acquisition of no more than 1,000 shares of the asset.

Figure 7:
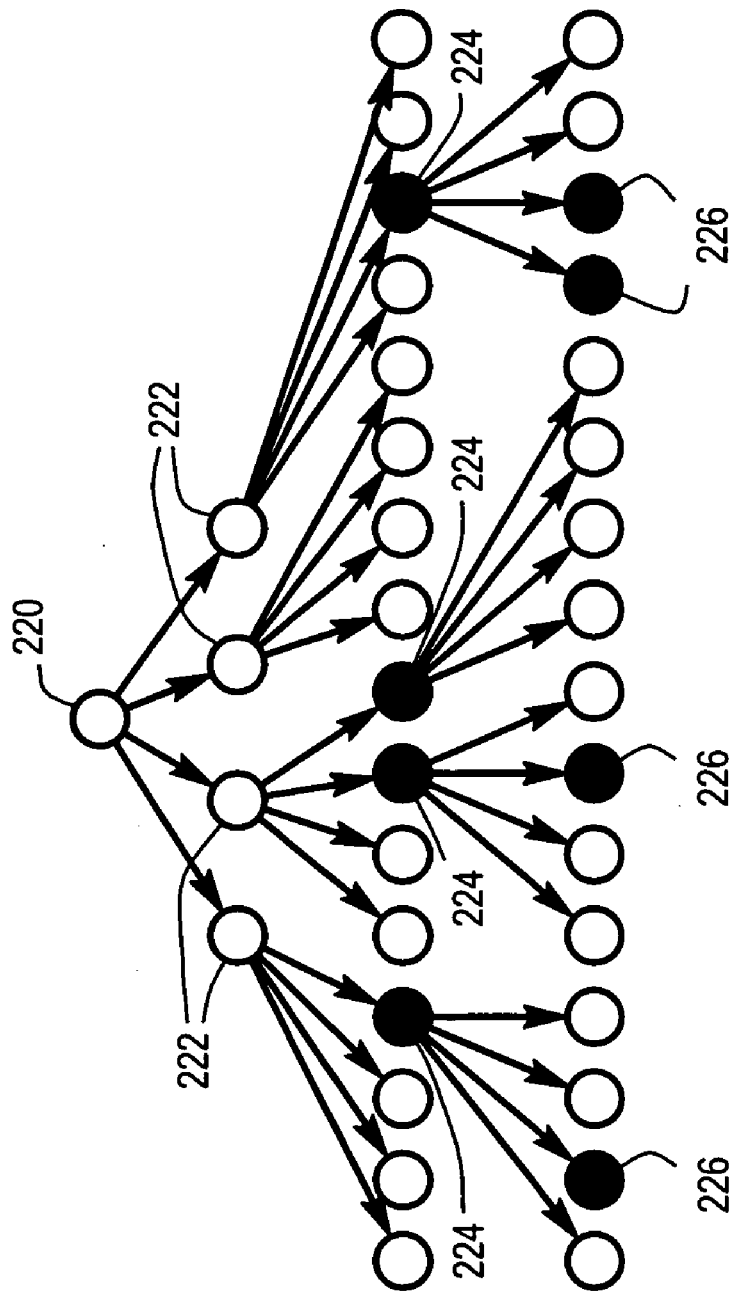
FIG. 7 is a state diagram illustrating the generation and pruning of new states according to the technique shown in FIG. 6.

An illustration of the foregoing tree-searching technique, with pruning, is illustrated in FIG. 7. In the example shown in FIG. 7, four new states are generated from each existing state (i.e., starting from each existing state, the four "best" transactions to perform next are identified). Then, after an entire level of new states has been generated, those states are pruned so as to retain only the four best states.

The initial state 220 represents the ETA® profile for the managed portfolio prior to any modifications. From that state, the four best transactions are identified in step 156, which identification may or may not involve any forward looking. The result is four new states 222. Each of these new states 222 then is separately evaluated, and the four best transactions are identified for each such state 222, in the next iteration of step 156, resulting in a total of 16 new states. However, in this second iteration of step 156 pruning step 186 is performed, so that the four best states 224 of the existing 16 are identified, and only these four states 224 are processed further. Subsequently, four new states are generated from each state 224, in the manner described above, resulting again in a total of 16 states. From these new 16 states, once again only the four best states 226 are selected for further processing. Eventually, each path will terminate when the cash-flow criteria has been satisfied. Then, the best remaining state is selected and the corresponding combination of transactions (i.e., defined by the path from the initial state 220 to the best final state) is identified. In this way, irrespective of how many transactions ultimately are required, no more than 16 states need to be evaluated at any given time.

The techniques described above often can provide good results, particularly where the transaction volume necessary to achieve the specified cash-flow criterion is approximately the same as or smaller than the transaction volume necessary to move the ETA® profile for the managed portfolio from its current state to the ETA® profile for the tracked index. This generally will be the case where the required net cash flow into or out of the portfolio is relatively small, or where factors other than cash-flow needs are driving the portfolio adjustment (e.g., in response to a change in investment strategy so as to begin tracking a subject index, as described in more detail below in connection with FIG. 9).

However, where the transaction volume in connection with the cash-flow criterion is significantly larger than is necessary to align the two ETA® profiles (i.e., "excess cash-flow criterion"), the foregoing techniques can result in a large number of small transactions that move the ETA® profile for the managed portfolio within a small region around the vicinity of the ETA® profile for the tracked index. Often, the recommended transaction combination will not be efficient, involving an unduly large number of transactions, and the computation of the recommended transaction combination frequently also will be inefficient in terms of computer processing resources.

Figure 8:
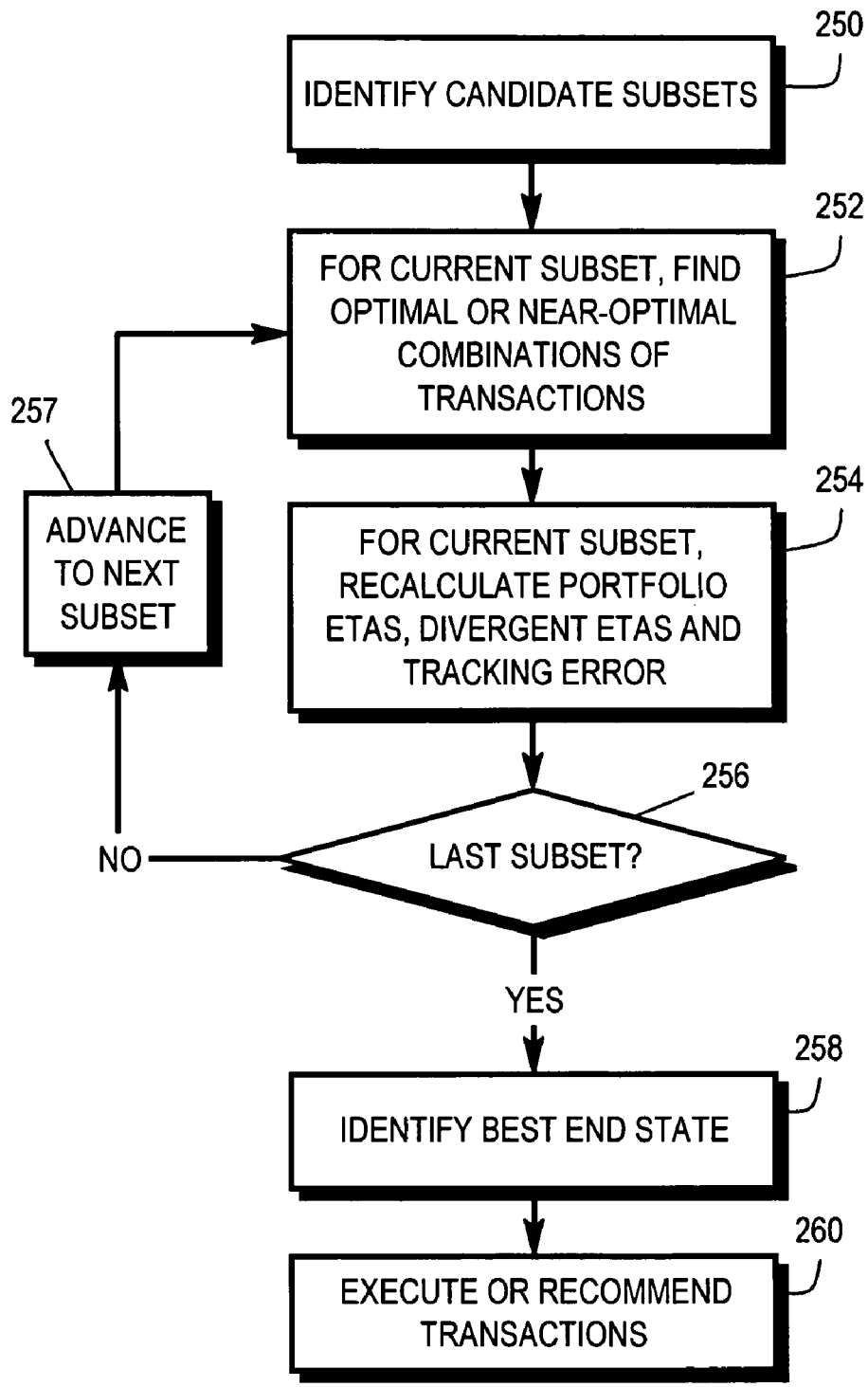
FIG. 8 is a flow diagram illustrating a technique for tracking an index or other portfolio according to a third representative of the embodiment of the present invention, by first identifying multiple potential subsets of the available assets and examining each such subset.
Figure 9:
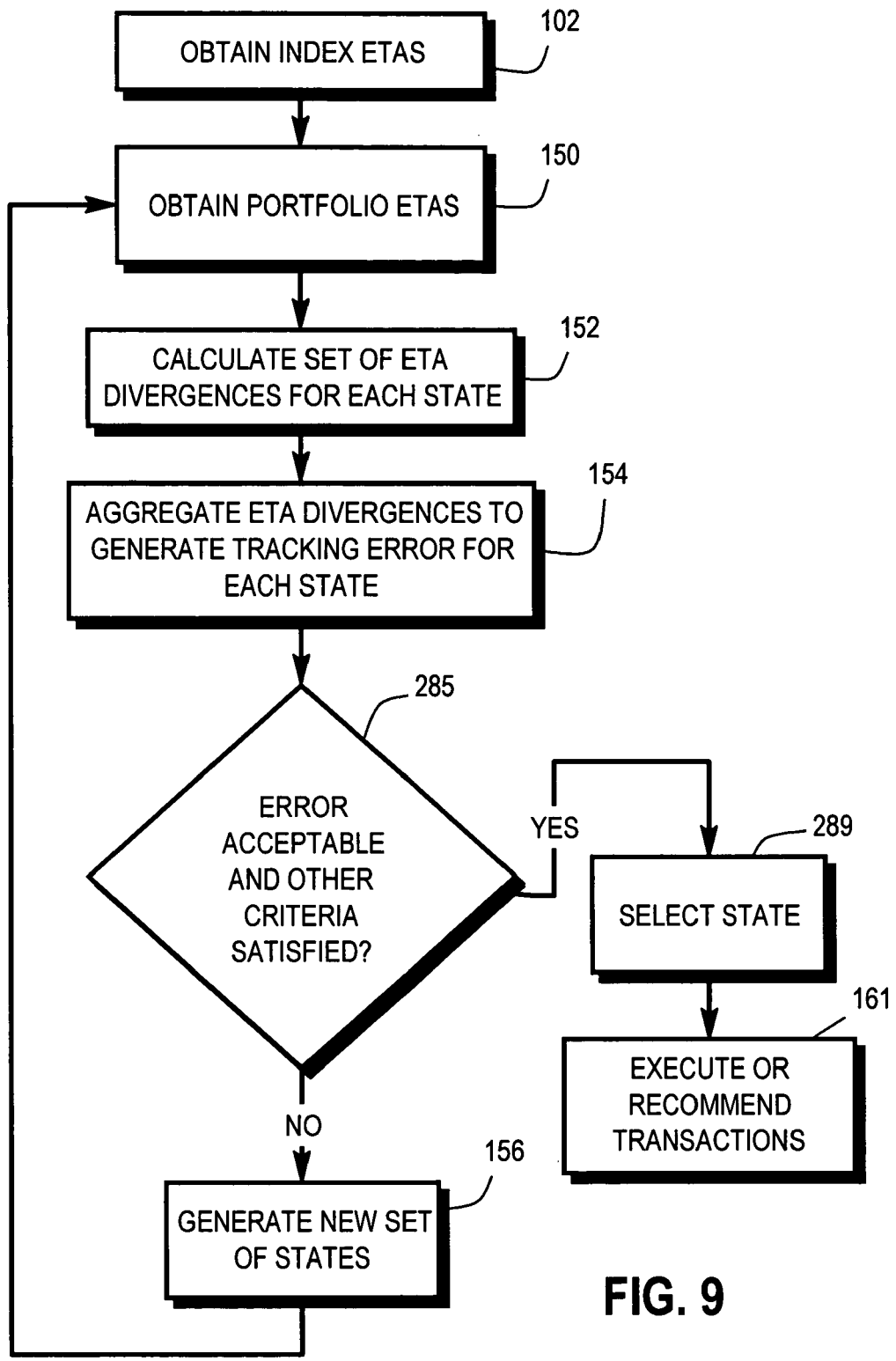
FIG. 9 is a flow diagram illustrating a technique for adjusting a portfolio in order to properly track an index or other portfolio, independent of any cash-flow needs.

FIG. 8 is a flow diagram illustrating a technique for tracking an index or other portfolio according to a third representative of the embodiment of the present invention. This technique also can provide a more optimal solution by looking ahead. However, here such looking ahead is done in a somewhat different manner that often can help address the excess-cash-flow-criterion problem. Basically, the concept in the present technique is to first identify multiple potential subsets of the available assets, with each such subset having an apparent high likelihood of being capable of being combined in a manner so as to achieve the desired outcome. Then, each such subset can be separately analyzed to identify an optimal combination of the assets in it.

More specifically, in step 250 a plurality of subsets of assets are identified, with each subset preferably being significantly smaller than the total number of assets that is available for executing transactions. In the preferred embodiments of the invention, the goal of this step 250 is to find a small number of assets whose ETA® profiles appear to be capable of being combined in order to achieve a combined ETA® profile that is as close as possible to all zeros (or to the divergent ETA® profile for the managed portfolio). In the preceding sentence, the word "small" generally will be defined relative to the cash-flow criterion (or to the excess cash-flow criterion). Once the desired number (or range of numbers) of assets has been identified, the asset subsets may be identified using any of a variety of different techniques, including neural network techniques, linear or other mathematical programming techniques, other types of tree-searching techniques, clustering techniques, or any combination of the foregoing. Often, in addition to identifying individual subsets, a byproduct of this step 250 (generated when determining the fitness of each potential subset) will be to identify at least a rough proportionate combination of the assets in each subset that is likely to achieve a near-zero combination ETA® profile.

In step 252, an optimal combination of the assets in the current subset is identified. Preferably, this step is performed by starting with the rough proportionate combination identified in step 250 (scaled, if necessary, to achieve the allotted cash-flow criterion) and modifying the proportionate amounts to optimize the resulting combination ETA® profile. This can be accomplished in any of a variety of different ways, such as by systematically or randomly incrementally modifying the proportionate quantities of each asset using a tree-searching technique, and then using pruning to eliminate the obviously inferior paths.

In step 254, the ETA® profile for the managed portfolio and then the divergent ETA® profile and tracking error (from the tracked index) are re-calculated for the current subset, on the assumption that the transactions identified in step 252 will be performed.

In step 256, a determination is made as to whether or not the current subset is the last subset identified. If not, then the next subset is selected in step 257 and processing returns to step 252 to begin processing that subset. Otherwise, processing proceeds to step 258.

In step 258, the subset (and its corresponding optimal combination of assets therein) that results in the optimal end state (e.g., closest to a combination ETA® profile of all zeros or the negative of the divergent ETA® profile) is identified.

Finally, in step 260 the identified transactions either are recommended (e.g., in the event that the foregoing process steps are executed by a computer and a human being is required to make the final transaction decisions) or are executed (e.g., automatically by a computer or by the same person who performed the foregoing process steps).

The foregoing technique can be particularly well-suited to situations where the divergent ETA® profile is small relative to the cash-flow criteria or, alternatively, where there is a significant amount of excess cash-flow criterion. It is noted that the foregoing technique may be utilized independently or may be combined with any of the other techniques described above. For instance, 75-90 percent (or a portion that is based on the magnitude of the divergent ETA® profile) of the cash-flow criterion may be assigned to the technique of FIG. 8. Then, after the process of FIG. 8 has been completed, the balance of the cash-flow criterion, together with the portfolio ETA® profile and any other modified criteria resulting from the performance of the method shown in FIG. 8 may be input into any of the other techniques described above.

In this way, the technique of FIG. 8 first can be used to absorb most if not all of the excess cash-flow criterion (possibly with some improvement in the divergent ETA® profile, if that is the target of the process according to FIG. 8) and then any of the other techniques described above may be utilized to fine tune the ETA® profile for the managed portfolio in order to bring it more in line with the ETA® profile for the tracked index. As noted above, the allocation of the cash-flow criterion may be made dynamically. For example, when a certain amount of the cash-flow criterion has been utilized and the remaining cash-flow criterion is believed to be sufficient to move the resulting ETA® profile for the managed portfolio close to the ETA® profile for the tracked index, the technique of FIG. 8 may be terminated and any of the other techniques described above initiated.

Also, it should be noted that the process according to FIG. 8 may be utilized in creating a portfolio to track the performance of an index. Such a technique may be especially useful where the portfolio is intended to include a much smaller number of assets than are encompassed by the index.

FIG. 9 illustrates a technique which is similar to the technique shown in FIG. 5, but which can be used for portfolio adjustment irrespective of any immediate cash-flow needs. For example, the technique of FIG. 9 might be utilized when external factors have caused the ETA® profile for the tracked index to change. Probably the most common of such situations is when the composition of the tracked index changes. Another situation might be where the ETA® profiles for the managed portfolio and the tracked index drift apart based upon changes over time in the ETA® profiles for the individual assets. Yet another situation might be where the proportionate makeup of the tracked index effectively changes over time. With regard to this situation, for example, a company having disproportionate increases in its market value might have a correspondingly increasing impact on the ETA® profile for the tracked index, depending upon the method by which the return for the tracked index is calculated. Finally, a decision might be made that an existing portfolio should begin to track a particular index, requiring purchases and/or sales of assets in order to bring the portfolio in line with the ETA® profile of the index. In any of the foregoing situations, as well as a variety of others, such changes, if not sufficiently addressed by cash-flow-based modifications described above, might require the managed portfolio to be adjusted in order to more closely track the desired index.

Preferably, the goal of the technique illustrated in FIG. 9 is to decrease the tracking error to a level below a specified threshold. In the preferred implementation of this method, the user specifies an acceptable range for the total net amount of cash that is to be held within the portfolio upon completion of the present adjustment. Unless otherwise specified by the user, this technique preferably allows for the sale of any asset within the portfolio or the purchase of any asset on an approved buy list (e.g., any asset in the tracked index).

As will be readily appreciated, other than some differences in the specified cash-on-hand and other criteria, this technique can be nearly identical to the technique described above in connection with FIG. 5. In fact, other than taking into account such different criteria, each of steps 102, 150, 152, 154, 156 and 161 in the method of FIG. 9 is identical to the correspondingly numbered step in the method of FIG. 5.

In step 285, in addition to checking any required net total cash criterion and any other specified criteria (as in step 158, shown in FIG. 5), a determination also is made as to whether or not the tracking error has been reduced below a specified threshold. If all of the criteria have not been satisfied, then processing proceeds to step 156 in order to generate a new set of states to be processed. Otherwise, processing proceeds to step 289.

In step 289, the state that satisfied the criteria set forth in step 285 is selected. If multiple states satisfied such criteria, then the best state (e.g., the one that results in the smallest tracking error) is selected.

In a similar manner, it is straightforward to modify the process illustrated in FIG. 8 to permit portfolio adjustment based upon considerations other than cash-flow needs.

Prior to execution of any of the tracking techniques described above, it is preferable to perform a step of calculating the effects of any user-designated transactions, both on the ETA® profile for the managed portfolio and on the specified constraints. The resulting state (together with the corresponding constraints) then is used as the input to be selected technique. Ultimately, if it is determined that an acceptable solution cannot be achieved if all of the user-designated transactions are performed, a message to that effect may be displayed to the user and/or the user-designated transactions may be automatically modified to the extent necessary to achieve an acceptable tracking error. Moreover, where the user specifies a set of assets, e.g., to be purchased, any of the techniques described above may be utilized to identify the optimal combination of such assets to purchase.

In the preferred implementation of each of the foregoing methods, the user specifies an acceptable range for the total net amount of cash that is to be held within the portfolio upon completion of the present adjustment. The total cash within the portfolio may vary outside of this range at certain points within the execution of any such method, provided that appropriate transactions subsequently are scheduled to bring the total portfolio cash within the specified range.

Potential-Based Asset Comparison.

Figure 10:
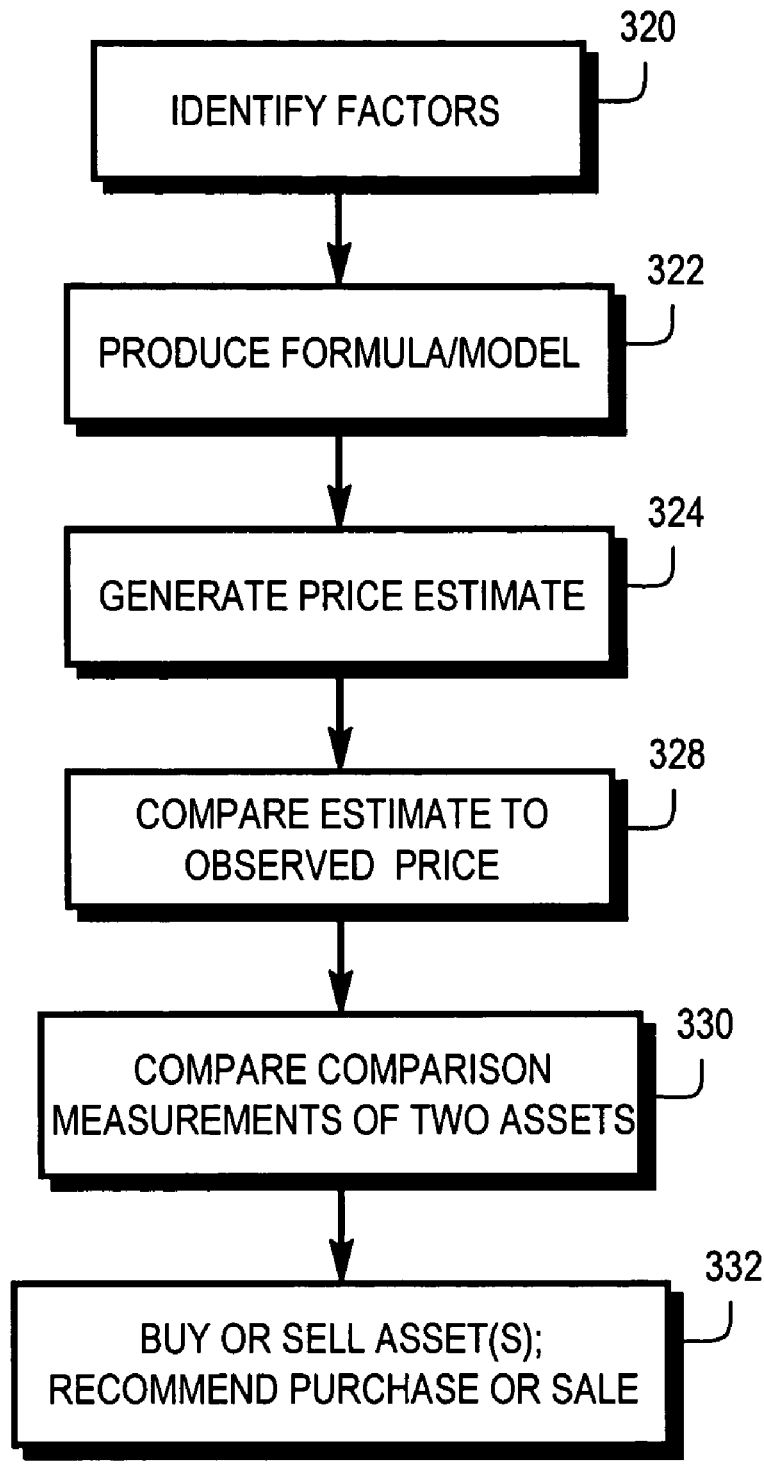
FIG. 10 is a flow diagram showing a technique according to the present invention for assessing the performance of a portfolio in comparison to the performance of an index.

FIG. 10 illustrates a flow diagram showing a technique according to the present invention for assessing the performance of a portfolio in comparison to the performance of an index. Initially, in step 320 factors that tend to influence, or that otherwise are related to, the market value of an asset under consideration are identified. Preferably, a minimum of 5-10 such factors are used and, more preferably, the 18 factors listed above are utilized. However, it is also possible to tailor the factors to the specific asset under consideration, e.g., using any of the techniques described in the '748 and '025 Applications.

In step 322, a model is produced that relates the market value of the subject asset to the historical data values for the identified factors. In the preferred embodiment of the invention, this step is performed using a linear or nonlinear multiple regression technique. However, any of the other techniques described in the '748 and '025 Applications instead may be used. Depending upon the modeling process, the resulting model may be expressed as an equation (e.g., for regression techniques) or provided as a computer model (e.g., for models generated using neural-network techniques) without any identified mathematical form.

The generation of a model in this step 322 typically will require the designation of a period of time in which historical data values are observed. Preferably, this period of time is designated to be the three years immediately preceding either the current (or other base) date or the date that is k prior to the current (or other base) date, where preferably k=3 months. However, the observation period instead may be selected using any of the techniques described in the '748 and '025 Applications.

In step 324, a price (or market value) estimate is generated using the derived model together with observed data values for the factors. In the preferred embodiments of the invention, current values (or values as of the other base date) are utilized for the factors in this step 324.

Next, in step 328 the market value estimated in step 324 is compared against a market value for the asset that actually has been observed. More specifically, in the preferred embodiments of the invention a comparison measurement between these two quantities is generated. Such comparison measurement may be specified in any of a variety of different ways, but preferably is specified in accordance with one of the following formulas:

$$PotentialIndex(1) = \frac{Model(1)}{Actual(base - k)} \quad \text{Equation 11}$$

$$PotentialIndex(2) = \frac{Model(1) - Actual(base)}{Actual(base - k)} \quad \text{Equation 12}$$

$$RelativeValueIndex = \frac{Model(2)}{Actual(base)} \quad \text{Equation 13}$$

where

Model(1) is a market-value estimate that has been generated using a model having an observation period that ends k (e.g., 3 months) prior to the current (or other base) date and using data values for the factors as of the current (or other base) date;

Model(2) is a market-value estimate that has been generated using a model having an observation period that ends at the current (or other base) date and using data values for the factors as of the current (or other base) date;

Actual(base) is the actual market value of the asset at the current (or other base) date; and Actual(base−k) is the actual market value of the asset k (e.g., 3 months) prior to the current (or other base) date.

In step 330, the comparison measurement for the current asset (calculated in step 328) is compared against the comparison measurement for a second asset (e.g., an index or other portfolio), which second asset may be considered to be a benchmark. The comparison measurement for the benchmark may be determined by repeating steps 322, 324 and 328 above for such second asset. Preferably, the benchmark is an index and the first asset is a portfolio that attempts to emulate the index. The comparison may be performed by simply displaying the comparison measurements for each of the assets. Alternatively, a secondary comparison measurement may be generated, e.g., using the difference between the two comparison measurements or the ratio of one comparison measurement to the other. Such a secondary comparison measurement can be viewed as an intermediate-term estimate of the portfolio alpha with respect to the benchmark, and is particularly useful where further analysis is desired.

In step 332, assets are purchased and/or sold or recommendations are made to purchase and/or sell assets based on the comparison made in step 330. For example, in step 330 the comparison measurement for the benchmark may be subtracted from the comparison measurement for the subject asset. A negative value from such a calculation might suggest that the portfolio is overvalued as compared to the benchmark. As a result, selling shares in the subject portfolio might be indicated. Alternatively, a positive value might indicate that it is wise to purchase shares in the subject portfolio. It is noted that the t-statistic provides a measure of the statistical significance of the secondary comparison measure (or alpha estimate). Such statistical significance should of course be considered when determining whether the results are sufficiently meaningful to form the basis for any transactional decisions.

A variety of other measures also may be calculated for an asset. For example, one may define the Z-score of the current value for a factor as the number of standard deviations (which may be positive or negative) that the value differs from the factor's mean value over a specified observation period (e.g., over the last year). Then, one may define, e.g., a Composite Information Measure as follows:

$$CompositeInformationMeasure = \sum_i Z_i \eta_i \qquad \text{Equation 14}$$

The Composite Information Measure (or any similar measure) is used to identify situations in which an asset's value would have been expected to change significantly based upon current values for the ETA® factors, in comparison to the historical means for such factors. Large positive values might indicate that the market value of the asset is likely to increase (suggesting that the asset should be purchased), while large negative values might indicate that the market value of the asset is likely to decrease (suggesting that the asset should be sold). Accordingly, an appropriate strategy would be to calculate the Composite Information Measure (or similar measure) for a large number of assets, identify those having high magnitudes, and then purchase or sell such assets as indicated.

Also, certain "angle" statistics may be defined, e.g., as follows:

$$Angle = \frac{\Delta Model/Model}{\Delta Actual/Actual} \qquad \text{Equation 15}$$

Equation 15 calculates the percentage change in the market value estimated using the model over a specified period of time divided by the percentage change in the actually observed market value of the asset over the same period of time. Preferably, the subject period of time is one month or two months and, more preferably, is the immediately preceding one-month or two-month time period. Any model estimate may be utilized for this purpose, although it presently is preferred to use Model(2) above.

An angle statistic, such as defined in Equation 15 above, can tell an investor whether a subject asset is becoming relatively more overvalued or relatively more undervalued. The analysis of such trend information can be helpful in determining when to purchase or sell an asset. For example, assume that the angle statistic defined above has been less than 1 for a significant period of time (indicating increasing overvaluation in the market) and is just beginning to exceed 1, in an environment where the asset appears to have been overvalued (e.g., based on one of the comparison measures identified above) for a significant period of time. In such a case, it might be advisable to sell the asset, because the angle statistic indicates that the market is beginning to appropriately price the asset and, therefore, that its price will drop.

One also may calculate a Residual Risk Index (RRI) by calculating the average squared difference between the value estimated by the model and the actually observed market value over a relevant past period of time, taking the square root of such quantity, dividing it by the average of the actually observed market values for the asset over the subject period, and then multiplying by an appropriate Z value (e.g., from a statistical table), i.e.:

$$RRI = Z * \frac{\sqrt{\frac{\sum_N (Model - Actual)^2}{N}}}{\frac{\sum_N Actual}{N}} \qquad \text{Equation 16}$$

In the presently implemented embodiment of the invention, Z is fixed at 1.96, reflecting the 96 percent confidence interval for a t-distribution, and N is the total number of observations during the subject period of time.

Any model estimate may be used in the calculation of the RRI. However, in the preferred embodiments Model(2) is utilized. In the event the asset is a portfolio, Equation 16 may be applied directly to the portfolio as a whole or else may be applied to individual assets within the portfolio, which then are aggregated (e.g., averaged using value-weighting) in order to provide an aggregate RRI for the portfolio. Generally, it is preferable to apply Equation 16 directly to the portfolio in order to capture covariance effects that would not be reflected if the calculation separately were applied to the individual components.

The RRI provides a measure of asset-specific risk that is not described by the ETA® factors used in the corresponding model. More specifically, it measures the amount of an asset's price that is not accounted for by the model that has been utilized. A high RRI value might indicate that the subject asset is a candidate for conventional asset-specific analysis.

Conventional techniques for measuring a portfolio's error in tracking the performance of an index typically calculate the standard deviation (or variance) of the daily differences in return between the portfolio and the benchmark, thereby effectively penalizing any deviation from perfect tracking. This is illustrated graphically in FIG. 11A. There, the 45-degree line 360 represents ideal tracking of the index. Any deviation 362 from it is penalized. Moreover, the penalty typically increases at an increasing rate with the distance from the 45-degree line 360.

Figure 12:
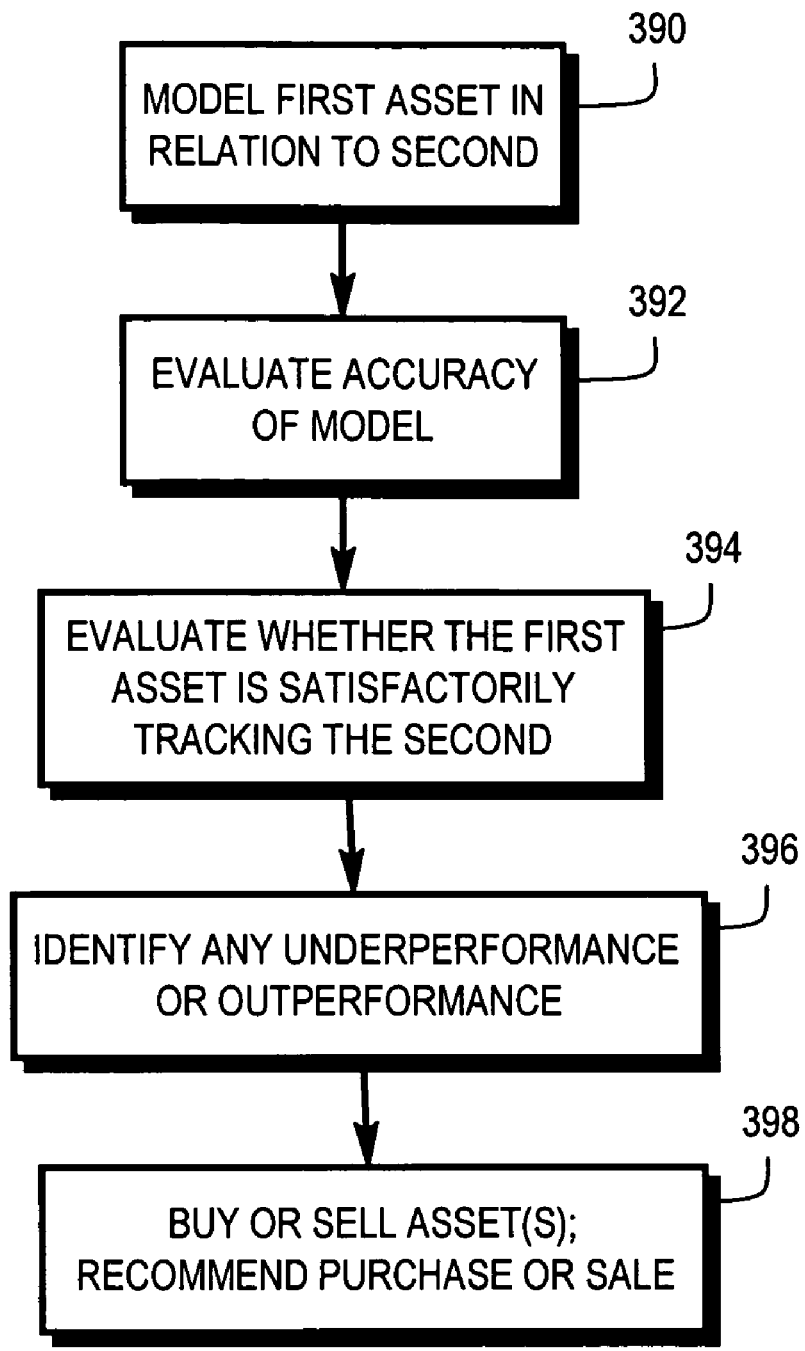
FIG. 12 is a flow diagram showing the technique according to the second embodiment of the present invention for assessing the performance of a portfolio in comparison to the performance of an index.

However, the present inventors believe that sustained deviations above line 360, which represent better performance than the index, should not be penalized at all. Accordingly, a better approach is to simultaneously measure tracking error and performance differences. Such an approach is illustrated in the flow diagram shown in FIG. 12.

Initially, in step 390 a first asset (typically a portfolio) is modeled in relation to a second asset (typically an index being tracked). In the preferred embodiments of the invention, such modeling is performed using a linear or nonlinear regression of the daily returns for the portfolio against the daily returns for the index. An example of the result is regression line 364, shown in FIG. 11B.

Next, in step 392 the quality (or accuracy) of the model is determined. Where regression has been performed in step 390, this preferably involves calculating the correlation coefficient. Such a measurement only penalizes deviations 366 from the regression line 364, rather than deviations from the 45-degree line 360.

In step 394, a determination is made as to whether or not the portfolio is accurately tracking the index. In the example given above, this can be determined by examining the slope of the regression line 364 (or beta). Ideally, it should be as close as possible to 1. In other embodiments, other parameters of the generated model may be examined. Alternatively, if the model does not result in an express mathematical formula (e.g., in the case of neural network modeling), the information may be obtained by sampling the results produced by the model (e.g., by taking incremental samples in the region of interest).

Finally, in step 396 any under-performance or over-performance (alpha) is identified. In the example shown in FIG. 11B, the portfolio is outperforming the index by an amount 365. It is noted that such outperformance would be penalized in the conventional techniques for monitoring tracking performance. Similar offset information may be obtained based on other model parameters in other embodiments. Once again, if the model does not result in an express mathematical formula (e.g., in the case of neural network modeling), the information may be obtained by sampling the results produced by the model (e.g., by taking incremental samples in the region of interest).

In step 398, assets are purchased or sold and/or recommendations are made to purchase or sell assets based on the information derived from the preceding steps. In this regard, for example, it might be desirable to purchase additional shares of a mutual fund that is outperforming, but otherwise tracking the performance of, a particular index. Alternatively, it might be desirable to sell shares of a portfolio that is not accurately tracking an index and also is underperforming it. The information that a portfolio is not accurately tracking an index and also is underperforming it also (or instead) might be used to trigger an adjustment to the holdings of the portfolio to more closely track the subject index.

System Environment.

Nearly all of the methods and techniques described herein can be practiced with a general-purpose computer system. Such a computer typically will include, for example, at least some of the following components interconnected with each other, e.g., via a common bus: one or more central processing units (CPUs), read-only memory (ROM), random access memory (RAM), input/output software and/or circuitry for interfacing with other devices and for connecting to one or more networks (which in turn may connect to the Internet or to any other networks), a display (such as a cathode ray tube display, a liquid crystal display, an organic light-emitting display, a polymeric light-emitting display or any other thin-film display), other output devices (such as one or more speakers, a headphone set and/or a printer), one or more input devices (such as a mouse, touchpad, tablet, touch-sensitive display or other pointing device; a keyboard, a microphone and/or a scanner), a mass storage unit (such as a hard disk drive), a real-time clock, a removable storage read/write device (such as for reading from and/or writing to RAM, a magnetic disk, a magnetic tape, an opto-magnetic disk, an optical disk, or the like), and a modem (which also may connect to the Internet or to any other computer network via a dial-up connection). In operation, the process steps to implement the above methods typically are initially stored in mass storage (e.g., the hard disk), are downloaded into RAM and then executed by the CPU out of RAM.

Suitable computers for use in implementing the present invention may be obtained from various vendors. Various types of computers, however, may be used depending upon the size and complexity of the tasks. Suitable computers include mainframe computers, multiprocessor computers, workstations, personal computers, and even smaller computers such as PDAs, wireless telephones or any other appliance or device, whether stand-alone, hard-wired into a network or wirelessly connected to a network. In addition, although a general-purpose computer system has been described above, a special-purpose computer may also be used. In particular, any of the functionality described above can be implemented in software, hardware, firmware or any combination of these, with the particular implementation being selected based on known engineering tradeoffs. In this regard, it is noted that the functionality described above primarily is implemented through fixed logical steps and therefore can be accomplished through programming (e.g., software or firmware), an appropriate arrangement of logic components (hardware) or any combination of the two, as is well-known in the art.

It should be understood that the present invention also relates to machine-readable media on which are stored program instructions for performing the methods of this invention. Such media include, by way of example, magnetic disks, magnetic tape, optically readable media such as CD ROMs and DVD ROMs, semiconductor memory such as PCMCIA cards, etc. In each case, the medium may take the form of a portable item such as a small disk, diskette, cassette, etc., or it may take the form of a relatively larger or immobile item such as a hard disk drive, ROM or RAM provided in a computer.

The foregoing description primarily emphasizes electronic computers. However, it should be understood that any other type of computer may instead be used, such as a computer utilizing any combination of electronic, optical, biological and/or chemical processing.

ADDITIONAL CONSIDERATIONS

Words such as "optimal", "optimize", "minimize", "best" and similar words are used throughout the above discussion. However, it should be understood that such words are not used in their absolute sense, but rather are intended to be viewed in light of other constraints, such as user-specified constraints and objectives, as well as cost and processing constraints.

Several different embodiments of the present invention are described above, with each such embodiment described as including certain features. However, it is intended that the features described in connection with the discussion of any single embodiment are not limited to that embodiment but may be included and/or arranged in various combinations in any of the other embodiments as well, as will be understood by those skilled in the art.

Similarly, in the discussion above, functionality may be ascribed to a particular module or component. However, unless any particular functionality is described above as being critical to the referenced module or component, functionality may be redistributed as desired among any different modules or components, in some cases completely obviating the need for a particular component or module and/or requiring the addition of new components or modules. The precise distribution of functionality preferably is made according to known engineering tradeoffs, with reference to the specific embodiment of the invention, as will be understood by those skilled in the art.

Thus, although the present invention has been described in detail with regard to the exemplary embodiments thereof and accompanying drawings, it should be apparent to those skilled in the art that various adaptations and modifications of the present invention may be accomplished without departing from the spirit and the scope of the invention. Accordingly, the invention is not limited to the precise embodiments shown in the drawings and described above. Rather, it is intended that all such variations not departing from the spirit of the invention be considered as within the scope thereof as limited solely by the claims appended hereto.

What is claimed is:

1. A method for comparing two assets, comprising:
   (a) identifying a set of factors having data values;
   (b) using a computer processor to perform the following steps:
      (i) processing historical data values for said factors and historical data for observed market values of a first asset over a period of time in order to obtain a first model for calculating market value estimates for the first asset as a function of said factors;
      (ii) calculating the first model using an input set of values for the factors, so as to obtain a market value estimate for the first asset;
      (iii) generating a first comparison measurement that describes a relationship between the market value estimate for the first asset and an observed market value of the first asset;
      (iv) processing historical data values for said factors and historical data for observed market values of a second asset over a period of time in order to obtain a second model for calculating market value estimates for the second asset as a function of said factors;
      (v) calculating the second model using an input set of values for the factors, so as to obtain a market value estimate for the second asset;
      (vi) generating a second comparison measurement that describes a relationship between the market value estimate for the second asset and an observed value of the second asset; and
      (vii) comparing the first comparison measurement to the second comparison measurement; and
   (c) at least one of purchasing or selling an asset based on the comparison made in step (vii).

2. A method according to claim 1, wherein the set of factors includes at least 5 factors.

3. A method according to claim 1, wherein the set of factors includes at least 10 factors.

4. A method according to claim 1, wherein said processing steps (i) and (iv) are performed by using a multiple regression technique.

5. A method according to claim 1, wherein said first asset is a managed portfolio and said second asset is an index that is being tracked.

6. A method according to claim 1, wherein each of said processing steps (i) and (iv) uses historical data over a period of at least one year.

7. A method according to claim 1, wherein the observed market value of the first asset that is used in said step (iii) has been observed as of a same point in time at which the input set of values for the factors used in said step (ii) have been observed.

8. A method according to claim 1, wherein the observed market value of the first asset that is used in said step (iii) has been observed as of a point in time that is at least two months prior to a point in time at which the input set of values for the factors used in said step (ii) have been observed.

9. A method according to claim 1, wherein the first comparison measurement comprises a ratio of the market value estimate for the first asset to the observed market value of the first asset.

10. A method according to claim 1, wherein the first comparison measurement comprises a difference between the market value estimate for the first asset and the observed market value of the first asset.

11. A method according to claim 1, wherein the comparison in step (vii) comprises calculating a difference between the first comparison measurement and the second comparison measurement.

12. A method according to claim 1, wherein said step (c) comprises at least one of purchasing or selling the first asset.

13. A method according to claim 1, wherein the input set of values for the factors used in said step (ii) have been observed at a same point in time as the input set of values for the factors used in said step (v).

14. An apparatus for comparing two assets, comprising:
   (a) obtaining means for obtaining a set of factors having data values;
   (b) processing means for processing historical data values for said factors and historical data for observed market values of a first asset over a period of time in order to obtain a first model for calculating market value estimates for the first asset as a function of said factors;
   (c) calculating means for calculating the first model using an input set of values for the factors, so as to obtain a market value estimate for the first asset;
   (d) generating means for generating a first comparison measurement that describes a relationship between the market value estimate for the first asset and an observed value of the first asset;
   (e) second processing means for processing historical data values for said factors and historical data for observed market values of a second asset over a period of time in order to obtain a second model for calculating market value estimates for the second asset as a function of said factors;
   (f) second calculating means for calculating the second model using an input set of values for the factors, so as to obtain a market value estimate for the second asset;
   (g) second generating means for generating a second comparison measurement that describes a relationship between the market value estimate for the second asset and an observed value of the second asset;
   (h) comparison means for comparing the first comparison measurement to the second comparison measurement; and
   (i) transaction means for, at least one of purchasing or selling an asset, or recommending the purchase or sale of an asset, based on the comparison made by said comparison means (h).

15. A computer-readable medium storing computer-executable process steps for comparing two assets, said process steps comprising steps to:
(a) obtain a set of factors having data values;
(b) process historical data values for said factors and historical data for observed market values of a first asset over a period of time in order to obtain a first model for calculating market value estimates for the first asset as a function of said factors;
(c) calculate the first model using an input set of values for the factors, so as to obtain a market value estimate for the first asset;
(d) generate a first comparison measurement that describes a relationship between the market value estimate for the first asset and an observed value of the first asset;
(e) process historical data values for said factors and historical data for observed market values of a second asset over a period of time in order to obtain a second model for calculating market value estimates for the second asset as a function of said factors;
(f) calculate the second model using an input set of values for the factors, so as to obtain a market value estimate for the second asset;
(g) generate a second comparison measurement that describes a relationship between the market value estimate for the second asset and an observed value of the second asset;
(h) compare the first comparison measurement to the second comparison measurement; and
(i) at least one of purchase or sell an asset, or recommend the purchase or sale of an asset, based on the comparison made in step (h).

16. A method according to claim 1, wherein the factors are identified in said step (a) as those that are likely to be correlated with a market value for at least one of the first asset and the second asset.

17. A method according to claim 1, wherein the input set of values for the factors used in said step (ii) are observed market values.

18. A method according to claim 1, wherein the input set of values for the factors used in said step (ii) and the input set of values for the factors used in said step (v) are observed values.

19. A method according to claim 1, wherein the factors comprise broad-based macroeconomic and financial indicators.

20. A method according to claim 1, wherein the comparison in step (vii) is performed by displaying the first comparison measurement and the second comparison measurement.

21. A method according to claim 1, wherein the comparison in step (vii) is performed by generating a secondary comparison measurement.

* * * * *